(12) United States Patent
Oskotsky et al.

(10) Patent No.: US 8,867,140 B2
(45) Date of Patent: Oct. 21, 2014

(54) LOW DISTORTION ATHERMALIZED IMAGING LENS

(75) Inventors: Mark L Oskotsky, Mamaroneck, NY (US); Michael J Russo, Roslyn, NY (US); Gerard M Perron, Acton, MA (US); David J Korwan, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 460 days.

(21) Appl. No.: 13/214,985

(22) Filed: Aug. 22, 2011

(65) Prior Publication Data
US 2013/0050840 A1    Feb. 28, 2013

(51) Int. Cl.
*G02B 3/00* (2006.01)
*G02B 9/00* (2006.01)
*G02B 13/22* (2006.01)
*G02B 9/12* (2006.01)
*G02B 13/18* (2006.01)

(52) U.S. Cl.
CPC    *G02B 13/22* (2013.01); *G02B 9/12* (2013.01); *G02B 13/18* (2013.01)
USPC .......................................... 359/662; 359/663

(58) Field of Classification Search
CPC ......... G02B 13/18; G02B 13/22; G02B 13/14
USPC .......................................... 359/663, 662, 649
See application file for complete search history.

(56) References Cited

U.S. PATENT DOCUMENTS

| | | | |
|---|---|---|---|
| 4,235,520 A | 11/1980 | Kimura | |
| 4,333,714 A | 6/1982 | Kreitzer | |
| 4,401,362 A | 8/1983 | Maeda | |
| 4,436,383 A | 3/1984 | Maeda | |
| 5,103,342 A | 4/1992 | Kataoka | |
| 5,625,495 A | 4/1997 | Moskovich | |
| 5,835,280 A | 11/1998 | Griffith | |
| 5,905,596 A | 5/1999 | Watanabe | |
| 6,038,078 A | 3/2000 | Yamamoto | |
| 6,388,817 B2 | 5/2002 | Nakai | |
| 6,563,650 B2 | 5/2003 | Moskovich | |
| 6,639,653 B2 | 10/2003 | Nagahama et al. | |

FOREIGN PATENT DOCUMENTS

| | | |
|---|---|---|
| JP | 11-142728 | 5/1999 |
| JP | 2010-139827 | 6/2010 |

*Primary Examiner* — Alicia M Harrington
(74) *Attorney, Agent, or Firm* — Maine Cernota & Rardin; Douglas P. Burum

(57) ABSTRACT

A compact, lens suitable for airborne photography and mapping has distortion less than 0.6% and is athermal from −15° C. to +40° C. The lens is near-telecentric to less than 11°, apochromatic over the wavelength range 450 nm-650 nm, and has a full field of view of 60° (high quality field over 53°). The lens can be secondary color corrected. In embodiments, the focal length is 101 mm and the back working distance is more than 10 mm. Embodiments have a focal plane diameter of 104 mm and are compatible for use with a CMOS 1.8 gigapixel multiple FPA. In embodiments, the lens comprises three groups of optical elements, with an aperture located within the second optical group. In some embodiments the first group includes two elements, the second group includes six or seven elements, and the third group include three elements. In embodiments the lens (without window) is less than 180 mm long.

39 Claims, 28 Drawing Sheets

WAVEFRONT ANALYSIS

---

```
       X REL. FIELD    0.00   0.00   0.00   0.00   0.00
       Y REL. FIELD    0.00   0.18   0.54   0.73   1.00
          WEIGHTS      1.00   1.00   1.00   1.00   1.00
    NUMBER OF RAYS     1580   1556   1340   1182    902

WAVELENGTHS    650.0  600.0  550.0  500.0  450.0
          WEIGHTS       55     75    100     95     89

FIELD                BEST INDIVIDUAL FOCUS            BEST COMPOSITE FOCUS
   FRACT   DEG    SHIFT    FOCUS    RMS   STREHL    SHIFT    FOCUS    RMS   STREHL
                  (MM.)    (MM.)  (WAVES)           (MM.)    (MM.)  (WAVES)

| Surface number | Radius | Thickness,mm | Glass | Clear aperture/2 |
|---|---|---|---|---|
| 1: | -129.86590 | 5.000000 | SBSL7_OHARA | 41.47 |
| 2: | 55.47164 | 9.620229 | | 36.51 |
| 3: | 93.12743 | 13.282758 | SLAH52_OHARA | 37.05 |
| 4: | -193.63723 | 32.315958 | | 36.84 |
| 5: | 702.56232 | 8.349251 | SBAH27_OHARA | 21.13 |
| 6: | -37.83706 | 1.900000 | KZFSN5_SCHOTT | 20.65 |
| 7: | 54.85115 | 0.100000 | | 17.52 |
| 8: | 34.63852 | 8.289475 | SBSL7_OHARA | 17.07 |
| 9: | -72.12363 | 1.000000 | | 16.40 |
| Aperture stop: | | 3.023834 | | 11.98 |
| 11: | -44.07919 | 1.900000 | KZFSN5_SCHOTT | 13.20 |
| 12: | 30.88559 | 7.590710 | SBAH27_OHARA | 15.48 |
| 13: | -83.73314 | 0.100000 | | 15.95 |
| 14: | 38.41752 | 9.165871 | SBSL7_OHARA | 17.69 |
| 15: | -54.45233 | 0.884839 | | 17.68 |
| 16: | -83.50069 | 5.000000 | KZFSN5_SCHOTT | 17.41 |
| 17: | 40.22135 | 34.836882 | | 17.75 |
| 18: | -27.75720 | 6.000000 | CAF2_SCHOTT | 24.80 |
| 19: | -291.01113 | 5.672332 | | 39.11 |
| 20: | -173.59692 | 11.958626 | STIH53_OHARA | 44.76 |
| 21: | -81.45265 | 0.100000 | | 45.86 |
| 22: | 198.18460 | 13.909236 | SLAH60_OHARA | 57.30 |
| 23: | -467.43992 | 13.934321 | | 57.47 |

Aspherical surfaces equation:

$$z(r) = \frac{r^2}{R\left(1 + \sqrt{1 - (1+\kappa)\frac{r^2}{R^2}}\right)} + \alpha_1 r^2 + \alpha_2 r^4 + \alpha_3 r^6 + \cdots,$$

Where:
$z(r)$ is the sag along the axis parallel to the optical axis at distance r from vertex of the surface, R is the surface radius, k is conic constant, $\alpha_1$, $\alpha_2$, $\alpha_3$ and so on are coefficients of the equation - they describe deviation of the aspherical surface from the axially symmetric quadric surface.

| Aspherical surface number | aspherial surface equation coefficients | | | | |
|---|---|---|---|---|---|
| | k | $\alpha_1$ | $\alpha_2$ | $\alpha_3$ | $\alpha_4$ |
| 4 | 0 | 0.294932E-07 | -0.881134E-10 | 0.165359E-13 | 0.108485E-16 |
| 16 | 0 | -0.606497E-05 | -0.228387E-08 | 0.126695E-11 | -0.227964E-15 |
| 20 | 0 | 0.575554E-06 | -0.350877E-10 | -0.266881E-13 | 0.589549E-17 |

FIG. 7

SPECIFICATION DATA

WAVE LENGTHS, nm 650.00   600.00   550.00   500.00   450.00

FIELDS OF VIEW, DEGREES

| | | | | | |
|---|---|---|---|---|---|
| XAN | 0.00000 | 0.00000 | 0.00000 | 0.00000 | 0.00000 |
| YAN | 0.00000 | 5.00000 | 15.00000 | 20.00000 | 26.50000 |

REFRACTIVE INDICES

| Wave lengths, nm | 650.00 | 600.00 | 550.00 | 500.00 | 450.00 | Abbe number Vd |
|---|---|---|---|---|---|---|
| KZFSN5_SCHOTT | 1.649587 | 1.653101 | 1.657624 | 1.663660 | 1.672092 | 39.63 |
| SLAH60_OHARA | 1.827894 | 1.832626 | 1.838763 | 1.847011 | 1.858606 | 37.16 |
| SBAH27_OHARA | 1.696897 | 1.700493 | 1.705147 | 1.711390 | 1.720162 | 41.24 |
| STIH53_OHARA | 1.837273 | 1.844526 | 1.854151 | 1.867463 | 1.886939 | 23.80 |
| SBSL7_OHARA | 1.514053 | 1.515825 | 1.518051 | 1.520943 | 1.524849 | 64.10 |
| CAF2_SCHOTT | 1.432570 | 1.433563 | 1.434822 | 1.436467 | 1.438693 | 94.99 |
| SLAH52_OHARA | 1.794322 | 1.798350 | 1.803543 | 1.810469 | 1.820110 | 42.20 |

FIRST ORDER PROPERTIES

EFL     101.0000

BFL     13.9381

FFL     -20.9459

FNO     4.5000
IMG DIS  13.9343

OAL     180.0000

PARAXIAL IMAGE

HT      50.3567
ANG     26.5000

ENTRANCE PUPIL

DIA     22.4444
THI     51.9099

EXIT PUPIL

DIA     31.1147
THI     -126.0782

FIG. 7 (continued)

WAVEFRONT ANALYSIS

----------------------------------------------------------------------------------------------------

```
       X REL. FIELD    0.00    0.00    0.00    0.00    0.00
       Y REL. FIELD    0.00    0.18    0.54    0.73    1.00
          WEIGHTS      1.00    1.00    1.00    1.00    1.00
     NUMBER OF RAYS    1580    1558    1372    1202    946

WAVELENGTHS    650.0   600.0   550.0   500.0   450.0
          WEIGHTS      55      75      100     95      89
```

```
FIELD              BEST INDIVIDUAL FOCUS              BEST COMPOSITE FOCUS
  FRACT   DEG    SHIFT      FOCUS    RMS    STREHL     SHIFT      FOCUS    RMS    STREHL
                 (MM.)     (MM.)   (WAVES)            (MM.)      (MM.)   (WAVES)

X  0.00   0.00   0.000000   0.003214  0.0397  0.940   0.000000   0.001521  0.0401  0.939
Y  0.00   0.00   0.000000             0.000000

X  0.00   0.00   0.000000   0.000130  0.0435  0.928   0.000000   0.001521  0.0438  0.927
Y  0.18   5.00  -0.000044             0.000034

X  0.00   0.00   0.000000  -0.004451  0.0792  0.781   0.000000   0.001521  0.0814  0.770
Y  0.54  15.00  -0.001158            -0.000305

X  0.00   0.00   0.000000  -0.000026  0.0843  0.755   0.000000   0.001521  0.0844  0.755
Y  0.73  20.00  -0.000724            -0.000480

X  0.00   0.00   0.000000   0.017425  0.0772  0.791   0.000000   0.001521  0.0864  0.745
Y  1.00  26.50   0.002566             0.000507
```

COMPOSITE RMS FOR
                      POSITION 1:    0.06740

Units of RMS are waves at 512.4 nm.                    FIG. 9

| Surface number | Radius | Thickness, mm | Glass | Clear aperture/2 |
|---|---|---|---|---|
| 1: | -124.09345 | 4.000000 | SBSL7_OHARA | 38.62 |
| 2: | 58.99244 | 8.203417 | | 34.40 |
| 3: | 138.40019 | 9.896213 | SLAH60_OHARA | 34.48 |
| 4: | -175.94654 | 31.935685 | | 34.31 |
| 5: | 1358.73428 | 7.982708 | SBAH27_OHARA | 20.55 |
| 6: | -37.59348 | 2.000000 | KZFSN5_SCHOTT | 20.10 |
| 7: | 63.57500 | 0.100000 | | 17.49 |
| 8: | 35.77401 | 8.231694 | SBSL7_OHARA | 17.04 |
| 9: | -70.96972 | 1.000000 | | 16.37 |
| STO: | INFINITY | 3.317454 | | 12.78 |
| 11: | -42.42568 | 2.000000 | KZFSN5_SCHOTT | 13.83 |
| 12: | 32.24658 | 8.268874 | SBAH27_OHARA | 16.18 |
| 13: | -73.40921 | 0.100000 | | 16.66 |
| 14: | 38.33026 | 9.823331 | SBSL7_OHARA | 18.31 |
| 15: | -54.12046 | 1.307844 | | 18.23 |
| 16: | -72.12253 | 5.000000 | KZFSN5_SCHOTT | 17.82 |
| 17: | 40.61398 | 39.294617 | | 18.00 |
| 18: | -29.36558 | 6.000000 | SBSL7_OHARA | 26.11 |
| 19: | -145.98224 | 4.403097 | | 39.00 |
| 20: | -220.06103 | 13.517821 | STIH53_OHARA | 46.69 |
| 21: | -83.87297 | 0.100000 | | 47.78 |
| 22: | 191.34283 | 13.517245 | SLAH60_OHARA | 58.00 |
| 23: | -672.31427 | 14.816059 | | 58.12 |

Aspherical surfaces equation:

$$z(r) = \frac{r^2}{R\left(1 + \sqrt{1 - (1+\kappa)\frac{r^2}{R^2}}\right)} + \alpha_1 r^2 + \alpha_2 r^4 + \alpha_3 r^6 + \cdots,$$

Where:
$z(r)$ is the sag along the axis parallel to the optical axis at distance $r$ from vertex of the surface, $R$ is the surface radius, $k$ is conic constant, $\alpha_1$, $\alpha_2$, $\alpha_3$ and so on are coefficients of the equation - they describe deviation of the aspherical surface from the axially symmetric quadric surface.

| Aspherical surface number | aspherial surface equation coefficients | | | | |
|---|---|---|---|---|---|
| | k | $\alpha_1$ | $\alpha_2$ | $\alpha_3$ | $\alpha_4$ |
| 4 | 0 | -0.207041E-07 | -0.737550E-10 | 0.243370E-14 | -0.381992E-17 |
| 16 | 0 | -0.601752E-05 | -0.211229E-08 | 0.226564E-11 | -0.338452E-15 |
| 20 | 0 | 0.499358E-06 | -0.729937E-10 | -0.671110E-14 | 0.255542E-17 |

FIG. 14

SPECIFICATION DATA

WAVE LENGTHS, nm 650.00  600.00  550.00  500.00  450.00

FIELDS OF VIEW, DEGREES

| | | | | | |
|---|---|---|---|---|---|
| XAN | 0.00000 | 0.00000 | 0.00000 | 0.00000 | 0.00000 |
| YAN | 0.00000 | 5.00000 | 15.00000 | 20.00000 | 26.50000 |

REFRACTIVE INDICES

| Wave lengths, nm | 650.00 | 600.00 | 550.00 | 500.00 | 450.00 | Abbe number Vd |
|---|---|---|---|---|---|---|
| KZFSN5_SCHOTT | 1.649587 | 1.653101 | 1.657624 | 1.663660 | 1.672092 | 39.63 |
| SLAH60_OHARA | 1.827894 | 1.832626 | 1.838763 | 1.847011 | 1.858606 | 37.16 |
| SBAH27_OHARA | 1.696897 | 1.700493 | 1.705147 | 1.711390 | 1.720162 | 41.24 |
| STIH53_OHARA | 1.837273 | 1.844526 | 1.854151 | 1.867463 | 1.886939 | 23.80 |
| SBSL7_OHARA | 1.514053 | 1.515825 | 1.518051 | 1.520943 | 1.524849 | 64.10 |

FIRST ORDER PROPERTIES

EFL    101.0000

BFL    14.8412

FFL    -19.8032

FNO    4.5000

IMG DIS   14.8161

OAL    180.0000

PARAXIAL IMAGE

HT    50.3567

ANG    26.5000

ENTRANCE PUPIL

DIA    22.4444

THI    46.7214

EXIT PUPIL

DIA    34.0759

THI    -138.5006

FIG. 14 (continued)

WAVEFRONT ANALYSIS

---

ARGUS lens                                                POSITION 1

X REL. FIELD  0.00  0.00  0.00  0.00  0.00
                  0.00  0.00
     Y REL. FIELD  0.00  0.16  0.31  0.48  0.65
                  0.83  1.00
        WEIGHTS  1.00  1.00  1.00  1.00  1.00
                1.00  1.00
  NUMBER OF RAYS  1580  1566  1510  1404  1220
                1044  844

WAVELENGTHS  650.0  600.0  550.0  500.0  450.0
       WEIGHTS    55    75   100    95    89

FIELD            BEST INDIVIDUAL FOCUS        BEST COMPOSITE FOCUS
  FRACT  DEG   SHIFT   FOCUS    RMS   STREHL    SHIFT    FOCUS    RMS   STREHL
              (MM.)   (MM.)  (WAVES)       (MM.)   (MM.)  (WAVES)

| Surface number | Radius | Thickness, mm | Glass | Clear aperture/2 |
|---|---|---|---|---|
| 1: | -191.72938 | 4.450000 | SBSL7_OHARA | 47.75 |
| 2: | 53.34279 | 15.191850 | | 36.18 |
| 3: | 114.54767 | 12.321103 | SLAH52_OHARA | 36.82 |
| 4: | -159.04688 | 39.818633 | | 36.64 |
| 5: | -1344.85393 | 3.000000 | KZFSN5_SCHOTT | 16.13 |
| 6: | 54.76849 | 2.000000 | | 14.80 |
| 7: | 33.49188 | 6.565412 | SBSL7_OHARA | 14.06 |
| 8: | -55.41325 | 1.000000 | | 13.50 |
| STO: | INFINITY | 2.888136 | | 11.30 |
| 10: | -36.12432 | 1.800000 | KZFSN5_SCHOTT | 11.52 |
| 11: | 23.85626 | 7.841067 | SBAH27_OHARA | 13.80 |
| 12: | -62.61419 | 0.100000 | | 14.25 |
| 13: | 34.67658 | 7.757688 | SBSL7_OHARA | 15.63 |
| 14: | -58.88713 | 1.334412 | | 15.59 |
| 15: | -102.94094 | 4.450000 | KZFSN5_SCHOTT | 15.27 |
| 16: | 34.06787 | 32.253107 | | 15.39 |
| 17: | -26.28703 | 5.340000 | SBSL7_OHARA | 22.33 |
| 18: | -174.79380 | 2.704923 | | 32.94 |
| 19: | -131.76874 | 12.000000 | STIH53_OHARA | 35.41 |
| 20: | -79.22930 | 1.000000 | | 38.81 |
| 21: | 202.74308 | 16.183669 | SLAH60_OHARA | 49.75 |
| 22: | -157.03730 | 14.492953 | | 50.04 |

Aspherical surfaces equation:

$$z(r) = \frac{r^2}{R\left(1 + \sqrt{1 - (1+\kappa)\frac{r^2}{R^2}}\right)} + \alpha_1 r^2 + \alpha_2 r^4 + \alpha_3 r^6 + \cdots,$$

Where:
$z(r)$ is the sag along the axis parallel to the optical axis at distance $r$ from vertex of the surface, $R$ is the surface radius, $k$ is conic constant, $\alpha_1$, $\alpha_2$, $\alpha_3$ and so on are coefficients of the equation - they describe deviation of the aspherical surface from the axially symmetric quadric surface.

Aspherical surface number — aspherial surface equation coefficients

| Aspherical surface number | k | $\alpha_1$ | $\alpha_2$ | $\alpha_3$ | $\alpha_4$ |
|---|---|---|---|---|---|
| 4 | 0 | 0.407541E-07 | -0.103013E-09 | 0.239057E-13 | -0.146939E-16 |
| 15 | 0 | -0.841695E-05 | -0.498663E-08 | 0.209013E-11 | -0.457612E-14 |
| 19 | 0 | 0.801597E-06 | -0.463268E-10 | -0.107461E-12 | 0.344151E-16 |

FIG. 21

SPECIFICATION DATA

WAVE LENGTHS, nm 650.00   600.00   550.00   500.00   450.00

FIELDS OF VIEW, DEGREES

| | | | | | | |
|---|---|---|---|---|---|---|
| XAN | 0.00000 | 0.00000 | 0.00000 | 0.00000 | 0.00000 | |
| YAN | 0.00000 | 5.00000 | 15.00000 | 20.00000 | 25.0000 | 29.2500 |

REFRACTIVE INDICES

| Wave lengths, nm | 650.00 | 600.00 | 550.00 | 500.00 | 450.00 | Abbe number Vd |
|---|---|---|---|---|---|---|
| KZFSN5_SCHOTT | 1.649587 | 1.653101 | 1.657624 | 1.663660 | 1.672092 | 39.63 |
| SLAH60_OHARA | 1.827894 | 1.832626 | 1.838763 | 1.847011 | 1.858606 | 37.16 |
| SBAH27_OHARA | 1.696897 | 1.700493 | 1.705147 | 1.711390 | 1.720162 | 41.24 |
| STIH53_OHARA | 1.837273 | 1.844526 | 1.854151 | 1.867463 | 1.886939 | 23.80 |
| SBSL7_OHARA | 1.514053 | 1.515825 | 1.518051 | 1.520943 | 1.524849 | 64.10 |
| SLAH52_OHARA | 1.794322 | 1.798350 | 1.803543 | 1.810469 | 1.820110 | 42.2 |

FIRST ORDER PROPERTIES

EFL    90.0000

BFL    14.4889

FFL    1.3027

FNO    4.5000

IMG DIS   14.4930

OAL    180.0000

PARAXIAL IMAGE

HT    50.4024

ANG    29.2500

ENTRANCE PUPIL

DIA    20.0000

THI    55.5505

EXIT PUPIL

DIA    33.1811

THI    -134.8258

FIG. 21 (continued)

LOW DISTORTION ATHERMALIZED IMAGING LENS

FIELD OF THE INVENTION

The invention relates to optical lenses, and more particularly to low distortion lenses.

BACKGROUND OF THE INVENTION

Aerial mapping is a fast growing market for both military and civil applications. Aerial mapping acquires airborne image data using remote sensing and produces highly accurate topographic maps of ground regions of interest. Depending on the application, the topographic data produced by aerial mapping are used for evaluation of the dimensions and content of an observed target.

The ability of aerial mapping to provide comprehensive and detailed topographic information depends largely on the capabilities and features of the imaging lens that is used, including the distortion of the lens (whereby the image shape does not precisely reproduce the object shape, depending on the viewing angle), correction of monochromatic and polychromatic aberrations (including secondary spectrum), telecentricity, and thermal stability of the lens (ability to produce images over a required range of temperatures). Compactness and a wide field of view are also highly desirable.

U.S. Pat. No. 4,333,714 (Jun. 8, 1982) discloses a reverse telephoto wide angle lens for use in interchangeable photographic cameras. The '714 lens has a wide field of view, but it is far from being telecentric, it not corrected for distortion, and its secondary spectrum is quiet large. Also this lens is not athermalized and refocus of the image plane is required to compensate for the temperature change. At least for these reasons, the '714 lens is not useable for remote aerial high resolution photography and precise mapping.

Another example of a reverse telephoto lens is disclosed in U.S. Pat. No. 4,235,520 (Nov. 25, 1980). However, the '520 lens is not corrected for distortion, and has a significant field curvature and secondary spectrum. The '520 lens is also not athermalized.

A telecentric lens is disclosed in U.S. Pat. No. 6,563,650 (May 13, 2003). The '650 lens is designed to work with special beam splitters directing light onto three different LCDs. Spherical aberration is compensated in the '650 lens by the spherical aberration introduced by the beam-splitter. Distortion and secondary spectrum are not corrected.

Yet another telecentric lens is disclosed in U.S. Pat. No. 6,639,653 (Oct. 28, 2003). The '653 lens has a small numerical aperture (NA) and large overall length. However, distortion and secondary spectrum are not corrected.

Still another projection lens is disclosed in U.S. Pat. No. 6,038,078 (Mar. 14, 2000). The '078 lens is rather complicated, has a large overall length and a small field of view.

Yet another telecentric lens is disclosed in U.S. Pat. No. 5,905,596 (May 18, 1999). As with the '650 lens, spherical aberration of the '596 lens is corrected by the spherical aberration introduced by a beam-splitter, while distortion and secondary spectrum are not corrected.

Optical distortion is a function of the viewing angle. The distortion of lenses used in aerial mapping should be less than 0.5%. Such lenses should be able to operate at different altitudes, from sea level and up to 30000 feet.

The index of refraction of all optical glasses varies as a function of wavelength—this is called dispersion. When the chromatic aberration is not corrected, each wavelength is focused at a different point along the optical axis. If the optical system is achromatized over a given bandwith, the outer wavelengths of the bandwidth have a common focus. The primary axial color is the difference between the focus positions of the outer wavelengths, and should be corrected to achieve good image quality by selecting glass types and lens optical powers to compensate for the axial color.

When this state of achromatization is achieved, the primary color is corrected. The remaining chromatic aberration is referred to as secondary color. Secondary color is the difference between the focus points for the outer wavelengths of the achromatized bandwidth and the central wavelength. Secondary color is the limiting axial aberration in a lens design, and may be a dominating aberration for high resolution lenses used in aerial photography and mapping.

Monochromatic and chromatic aberrations depend on the heights and angles of rays at the optical element surface and the refraction index of the material. These aberrations also depend on the shape of the optical element, and on its location with respect to the aperture stop.

The contribution of the optical element to the total axial color is proportional to the square of axial marginal ray height at the lens, its optical power, and the reciprocal of the Abbe number of the lens material.

The Abbe number $V_d$ is given by $$V_d = (n_d - 1)/(n_{F'} - n_{C'}) \quad (1)$$

where $n_d$ is the index of refraction of the glass at the wavelength of the helium line d (587.6 nm), $n_{F'}$ is the index of refraction at the blue cadmium line F' (479.99 nm), and $n_{C'}$ is the index of refraction at the red cadmium line C' (643.85 nm).

Accordingly, the smaller the value of $V_d$, the greater the chromatic dispersion of the glass.

For the achromatic (axial color corrected) doublet, the powers and the dispersions of the elements are chosen to produce zero total dispersion by combining two elements to satisfy the following equation:

$$\Phi_1/V_1 = \Phi_2/V_2 \quad (2)$$

where
 $\Phi_1$ = the optical power of the first element,
 $V_1$ = the Abbe number of the first element,
 $\Phi_2$ = the optical power of the second element, and
 $V_2$ = the Abbe number of the second element.

The secondary spectrum SSdoublet for a cemented doublet of optical elements having an optical power $\Phi$ is given by:

$$SSdoublet = [(-1/\Phi)(P_1 - P_2)]/(V_1 - V_2) \quad (3)$$

where
 P1 = partial dispersion of the first element, and
 P2 = partial dispersion of the second element.

Partial dispersion describes dispersion for any two wavelengths with respect to the base wavelengths F' and C'. For example, the partial dispersion PdF for wavelengths d and F is defined by:

$$P_{dF} = (n_d - n_F)/((n_{F'} - n_{C'}). \quad (4)$$

Achromatic correction of a triplet is determined by the equation:

$$\Phi_1/V_1 + \Phi_2/V_2 + \Phi_3/V_3 = 0 \quad (5)$$

where
 $\Phi_1$ = the optical power of the first element,
 $V_1$ = the Abbe number of the first element,
 $\Phi_2$ = the optical power of the second element,
 $V_2$ = the Abbe number of the second element,
 $\Phi_3$ = the optical power of the third element, and
 $V_3$ = the Abbe number of the third element.

The condition for the triplet apochromatic correction is:

$$P_1(\Phi_1/V_1)+P_2(\Phi_2/V_2)+P_3(\Phi_3/V_3)=0, \quad (6)$$

Where $P_3$=partial dispersion of the third element.

As ambient temperature conditions change, the shapes and positions of optical elements in a lens will change, and the focal length and position of an image formed by the lens will change as well. This is caused by glass expansion and changes in the glass refractive index with temperature. This dependence on temperature can have a significant impact on lens performance. So as to compensate for these changes, either the focal plane array has to be adjusted along the optical axis, or some elements inside the lens have to be moved. However, this approach is highly undesirable, because additional electronics and software are needed to perform and monitor the necessary adjustments.

On the other hand, a lens does not need thermal adjustment when the change of the focus position within the required temperature range stays inside the depth of focus of the lens. The diffraction depth of focus DOF is defined by:

$$DOF=\lambda/NA^2 \quad (7)$$

where $\lambda$ is the wavelength and NA is numerical aperture at the image space For $\lambda$=550 nm and F#4.5 (NA=0.111): DOF≈0.045 mm.

Therefore, in this example, if the lens design meets a requirement that all changes of the focus position over a specified range of temperature changes are inside 0.045 mm, no refocusing is required.

The Opto-thermal expansion coefficient $\beta$ of an optical element is a property of the glass material, and it does not depend on the focal length or shape factor of the individual optics. For a single optical element:

$$\beta=\alpha+(dn/dT)/(n-1) \quad (8)$$

where $\alpha$=the thermal expansion coefficient of the glass
n=the refractive index of the glass at the current wavelength
T=temperature the change of the single element optical power $\Phi$ with temperature T is given by:

$$d\Phi/dT=(\Phi)(-\beta). \quad (9)$$

For an optical system comprising more than one optical element, the total change of the optical power $\Phi_{system}$ with temperature T is:

$$d\Phi_{system}/dT=-\Phi_{system}\Sigma(\Phi_i/\Phi_{system})(\beta_i) \quad (10)$$

where $\Phi_i$=optical power of a single element, and
$\beta_i$=single element Opto-thermal expansion coefficient.

Combining equations 2 and 10 allows design of an achromatic and athermalized doublet. Combining equations 2, 3 and 10 allows design of an athermalized doublet with a corrected secondary color (apochromatic correction).

Combining equations 5 and 10 allows design of an achromatic and athermalized triplet. Combining equations 5, 6 and 10 allows design of an athermalized apochromatic triplet.

Usually the partial dispersion of glasses has a linear dependence on a refractive index and Abbe number. The slope of a line connecting any two glasses determines the amount of a secondary spectrum in a doublet. The secondary spectrum can be reduced by using special glasses or materials with "abnormal" dispersion that varies non-linearly with the Abbe number, for example FK type glass (Schott) or SFPL (OHARA) or $CaF_2$.

What is needed, therefore, is a compact, very low distortion, near-telecentric, athermalized lens that is suitable for airborne photography and mapping.

SUMMARY OF THE INVENTION

A compact, very low distortion lens that is suitable for airborne photography and mapping has a full field of view of 60° with a high quality performance field of view of over 53°. The lens is near-telecentric to less than 11° lack of telecentricity, apochromatic over a light wavelength range of at least 450 nm-650 nm, and is athermal over a temperature range from −15° C. to +40° C. Distortion of the lens is less than 0.6%. In various embodiments the focal length is 101 mm and the back working distance is more than 10 mm.

Embodiments have a focal plane diameter of 104 mm and are compatible for use with a CMOS 1.8 gigapixel multiple FPA (focal plane array) having a 2×2 Bayer filter geometry and a pixel size of 2.2 μm×2.2 μm, wherein each CMOS image sensor pixel includes a series of dielectric layers above the photo detector, with a micro lens on top of each pixel to focus light onto the active area of the pixel floor, thereby minimizing both the amount of light lost and the amount of light incident on adjacent photodiodes. In various embodiments, secondary color is corrected so as to take full advantage of a high resolution FPA.

In various embodiments, the lens comprises three groups of optical elements, and the aperture is located within the second optical group. In some of these embodiments, the lens has a total length of less than 180 mm (not including the optical window). In certain of these embodiments the first group includes exactly two optical elements, the second group includes at least six optical elements, and the third group includes exactly three optical elements.

In some of these embodiments, the first group of optical elements corrects the lens for pupil spherical aberration, coma, and astigmatism, the second group of optical elements corrects the lens for first order chromatic aberrations, spherical aberrations, coma, and astigmatism, while also athermalizing the lens, and the third group of optical elements corrects the lens for field curvature and astigmatism.

The present invention is a low distortion lens suitable for airborne photography. The lens includes a first optical group including a plurality of optical elements, a second optical group, including a plurality of optical elements, an aperture located within the second optical group, and a third optical group, including a plurality of optical elements. The distortion of the lens is not more than 0.6%. The lens has a full field of view of at least 60°, with a quality performance field of 53°. The lens is telecentric to less than 11°. The lens is apochromatic over a range of at least 450 nm to 650 nm. And the lens is athermal over a temperature range of at least −15° C. to +40° C.

In embodiments, the first optical group includes exactly two optical elements, and the third optical group includes exactly three optical elements. In some of these embodiments the second optical group includes exactly six optical elements. And in other of these embodiments the second optical group includes exactly seven optical elements.

In various embodiments, the lens has a focal plane of at least 104 mm. In some of these embodiments the lens is compatible for use with a CMOS 1.8 gigapixel multiple FPA (focal plane array) having a 2×2 Bayer filter geometry and a pixel size of 2.2 μm×2.2 μm, wherein each CMOS image sensor pixel includes a series of dielectric layers above the photo detector, with a micro lens on top of each pixel to focus light onto the active area of the pixel floor, thereby minimizing both the amount of light lost and the amount of light incident on adjacent photodiodes.

In certain embodiments the lens has a length which does not exceed 180 mm, an optical window not being included in the length. In some embodiments at least one surface of one of the optical elements in each of at least two of the optical groups is aspherical. And in other embodiments the first group of optical elements corrects the lens for pupil spherical aberration, coma, and astigmatism, the second group of optical elements corrects the lens for first order chromatic aberrations, spherical abberations, coma, and astigmatism, while also athermalizing the lens, and the third group of optical elements corrects the lens for field curvature and astigmatism.

In various embodiments:
the first optical group has a positive optical power;
the second optical group has a positive optical power;
the third optical group has a positive optical power;
the first optical group includes two optical elements having, in order, a negative optical power and a positive optical power respectively, the first optical group being arranged to converge light received from an object and to direct the converged light onto the second optical group;
the second optical group includes seven optical elements having, in order, a positive optical power, a negative optical power, a positive optical power, a negative optical power, a positive optical power, a positive optical power, and a negative optical power, the second optical group being arranged to converge light received from the first optical group and to direct the converged light onto the third optical group;
the third optical group includes three optical elements having, in order, a negative optical power, a positive optical power, and a positive optical power, the third optical group being arranged to focus the light from the second optical group onto an imaging surface; and
the optical groups and optical elements satisfy the relationships given in paragraph [0092] below.

In some of these embodiments both the first optical element and the second optical element of the first optical group are double concave lenses. In some of these embodiments the second surface of the second optical element of the first optical group is aspherical.

In other of these embodiments the first optical element of the second optical group is a double convex lens, the second optical element of the second optical group is a double concave lens, the third optical element of the second optical group is a double convex lens, the fourth optical element of the second optical group is a double concave lens, the fifth optical element of the second optical group is a double convex lens, the sixth optical element of the second optical group is a double convex lens, and the seventh optical element of the second optical group is a double concave lens. In some of these embodiments the first surface of the seventh optical element of the second optical group is aspherical. In some of these embodiments the first and second optical elements of the second optical group are cemented to one another. In other of these embodiments the fourth and fifth optical elements of the second optical group are cemented to one another.

In still other of these embodiments the aperture stop is located between the third and fourth optical elements of the second optical group.

In yet other of these embodiments the first optical element of the third optical group is shaped as a negative meniscus lens whose concave surface faces toward the object, the second optical element of the third optical group is a positive meniscus lens whose concave surface faces toward the object, and the third optical element of the third optical group is a double convex lens. In some of these embodiments the first optical element of the third optical group is made from CaF2. In other of these embodiments the first surface of the second optical element of the third optical group is aspherical.

In certain embodiments:
the first optical group has a negative optical power;
the second optical group has a positive optical power;
the third optical group has a positive optical power;
the first optical group includes two optical elements having, in order, a negative optical power and a positive optical power respectively, the first optical group being arranged to converge light received from an object and to direct the converged light onto the second optical group;
the second optical group includes seven optical elements having, in order, a positive optical power, a negative optical power, a positive optical power, a negative optical power, a positive optical power, a positive optical power, and a negative optical power, the second optical group being arranged to converge light received from the first optical group and to direct the converged light onto the third optical group;
the third optical group includes three optical elements having, in order, a negative optical power, a positive optical power, and a positive optical power, the third optical group being arranged to focus the light from the second optical group onto an imaging surface; and
the optical groups and optical elements satisfy the relationships given in paragraph [00104] below.

In some of these embodiments both the first optical element and the second optical element of the first optical group are double concave lenses. In some of these embodiments the second surface of the second optical element of the first optical group is aspherical.

In other of these embodiments the first optical element of the second optical group is a double convex lens, the second optical element of the second optical group is a double concave lens, the third optical element of the second optical group is a double convex lens, the fourth optical element of the second optical group is a double concave lens, the fifth optical element of the second optical group is a double convex lens, the sixth optical element of the second optical group is a double convex lens, and the seventh optical element of the second optical group is a double concave lens.

In some of these embodiments the first surface of the seventh optical element of the second optical group is aspherical. In other of these embodiments the first and second optical elements of the second optical group are cemented to one another. And in still other of these embodiments the fourth and fifth optical elements of the second optical group are cemented to one another.

In yet other of these embodiment the aperture stop is located between the third and fourth optical elements of the second optical group.

In certain of these embodiment the first optical element of the third optical group is shaped as a negative meniscus lens whose concave surface faces toward the object, the second optical element of the third optical group is a positive meniscus lens whose concave surface faces toward the object, and the third optical element of the third optical group is a double convex lens. In some of these embodiments the first optical element of the third optical group is made from CaF2. And in other of these embodiments the first surface of the second optical element of the third optical group is aspherical.

In various embodiments:
all three optical groups have positive optical powers; the first optical group includes two optical elements having, in order, a negative optical power and a positive optical power respectively, the first optical group being arranged to converge light received from an object and to direct the converged light onto the second optical group;

the second optical group includes six optical elements having, in order, a negative optical power, a positive optical power, a negative optical power, a positive optical power, a positive optical power, and a negative optical power, the second optical group being arranged to converge light received from the first optical group and to direct the converged light onto the third optical group;

the third optical group includes three optical elements having, in order, a negative optical power, a positive optical power, and a positive optical power, the third optical group being arranged to focus the light from the second optical group onto an imaging surface; and the optical groups and optical elements satisfy the relations given in paragraph [00115] below.

In some of these embodiments the first optical element of the first optical group is a double concave lens, and the second optical element of the first optical group is a double convex lens. And in some of these embodiments the second surface of the second optical element of the first optical group is aspherical.

In certain of these embodiments the first optical element of the second optical group is a double concave lens, the second optical element of the second optical group is a double convex lens, the third optical element of the second optical group is a double concave lens, the fourth optical element of the second optical group is a double convex lens, the fifth optical element of the second optical group is a double convex lens, and the sixth optical element of the second optical group is a double concave lens. In some of these embodiments the first surface of the sixth optical element of the second optical group is aspherical. In other of these embodiments the third and fourth optical elements of the second optical group are cemented to one another.

In some of these embodiments the aperture stop is located between the second and third optical elements of the second optical group.

In other of these embodiments the first optical element of the third optical group is shaped as a negative meniscus lens whose concave surface faces toward the object, the second optical element of the third optical group is a positive meniscus lens whose concave surface faces toward the object, and the third optical element of the third optical group is a double convex lens. And in some of these embodiments the first surface of the second optical element of the third optical group is aspherical.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 presents a wave front analysis of the embodiment of FIG. 1;

FIG. 7 is a listing of properties of optical elements for the embodiment of FIG. 1;

FIG. 9 presents a wave front analysis of the embodiment of FIG. 8;

FIG. 14 is a listing of properties of optical elements for the embodiment of FIG. 8;

FIG. 16 presents a wave front analysis of the embodiment of FIG. 15;

FIG. 21 is a listing of properties of optical elements for the embodiment of FIG. 15.

DETAILED DESCRIPTION

The present invention is a compact, very low distortion lens that is suitable for airborne photography and mapping has a full field of view of 60° with a high quality performance field of view of over 53°. The lens is near-telecentric to less than 11°, apochromatic over a light wavelength range of at least 450 nm-650 nm, and is athermal over a temperature range from −15° C. to +40° C. Distortion of the lens is less than 0.5%. In various embodiments the focal length is 101 mm and the back working distance is more than 10 mm.

Figure 1:
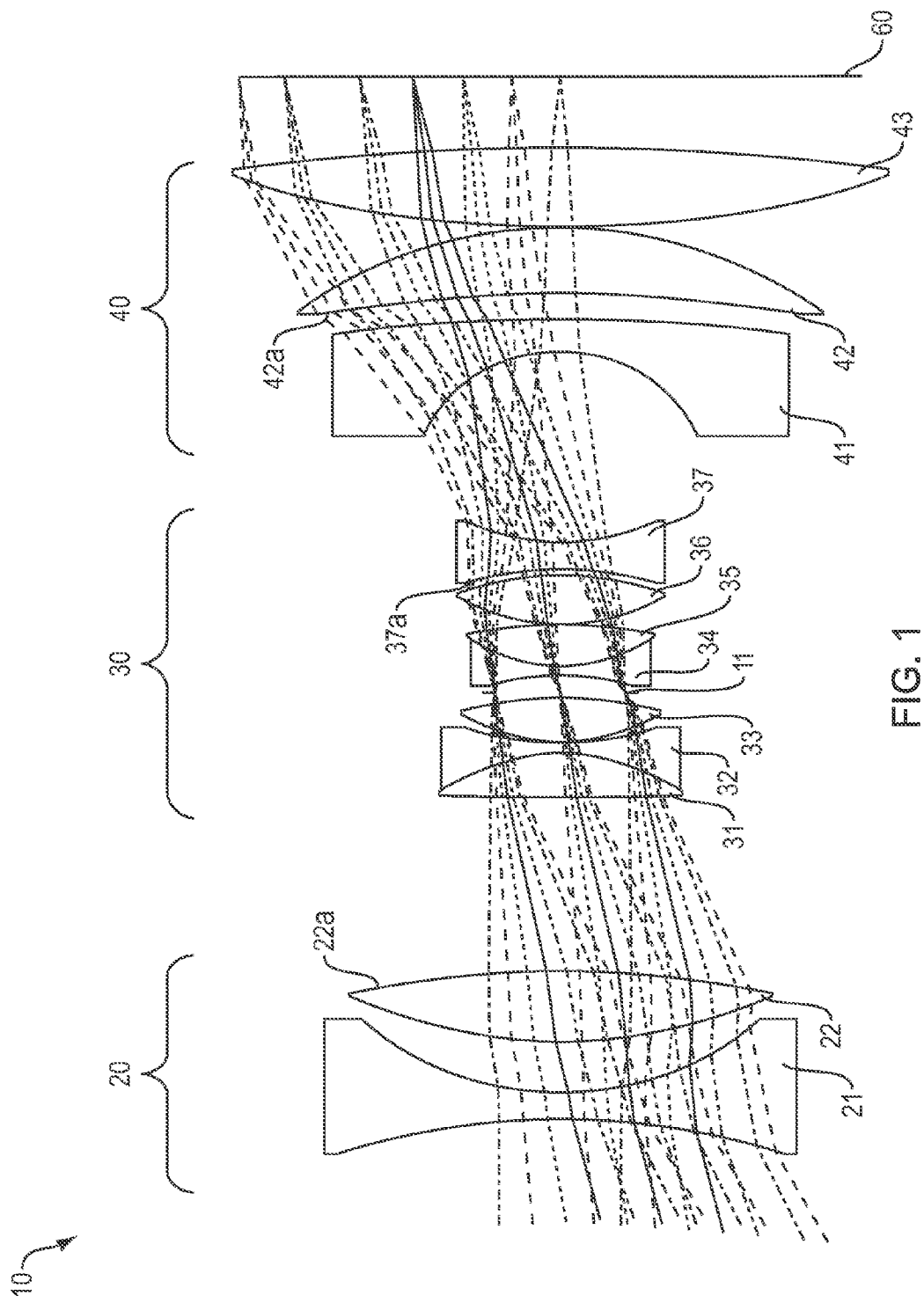
FIG. 1 is a cross sectional side view illustrating a first embodiment of the present invention.

FIG. 1 is a cross-sectional illustration of a first embodiment of the lens 10 of the present invention. The lens 10 includes a first optical group 20, a second optical group 30 and a third optical group 40 in order from the object to the image plane. The aperture stop 11 is positioned inside the second optical group 30. An image of a distant object is formed on a focal plane array 60. In embodiments, the focal plane array incorporates CMOS with micro lenses, 2×2 Bayer filter geometry, and 1.8 Giga pixels. In other applications the image surface 60 may constitute CCD or a direct viewing screen.

In the embodiment of FIG. 1 the first optical group 20 has an overall positive optical power and is configured to receive light from a remote object and to direct the converged light onto the second optical group 30. The first optical group 20 includes two optical elements 21 and 22, having negative and positive optical powers respectively. As seen in FIG. 1, the first optical element 21 of the first optical group 20 has a negative optical power and is a double concave lens. The second optical element 22 has a positive optical power and is double convex lens. The second surface 22a of the second element 22 of the first optical group may be aspherical so as to reduce the F number of the lens 10. The mutual configuration of the two optical elements 21, 22 of the first optical group 20 corrects the lens for pupil spherical aberration, spherical aberration, coma and astigmatism without introducing a distortion, while satisfying relationships required among the optical elements to achieve high resolution of the lens 10.

The second optical group 30 has a positive overall optical power and is configured to further converge light from the first optical group 20 and to direct diverged light onto the third optical group 40. The second optical group 20 includes seven optical elements 31, 32, 33, 34, 35, 36 and 37, having a positive optical power, a negative optical power, a positive optical power, a negative optical power, a positive optical power, a positive optical power and a negative optical power respectively. The aperture stop 11 is located within the second optical group 30 between optical elements 33 and 34. The position of the aperture stop inside the second optical group allows correction of the telecentricity and improves the compactness of the lens 10. Optical elements 31 and 32 and optical elements 34 and 35 may be cemented to one another as explained in more detail below.

The first optical element 31 of the second optical group 30 is a double convex lens, the second optical element 32 is a double concave lens, the third optical element 33 is a double convex lens, the fourth optical element 34 is a double concave lens, the fifth optical element 35 is a double convex lens, the sixth optical element 36 is a double convex lens, and the seventh optical element 37 is a double concave lens.

As mentioned supra, the first optical element 31 and the second optical element 32 of the second optical group 30 may be cemented to one another for the axial and secondary color correction (apochromatic correction) in the lens 10. Optical elements 34 and 35 may be cemented to one another for the same reason. In various embodiments the first surface 37a of the seventh optical element 37 is spherical so as to compensate for residual monochromatic aberrations across the field of view.

The mutual configuration and choice of glasses of the elements in the second optical group 30 corrects the lens for first order chromatic aberrations, spherical aberration, coma, and astigmatism, while achieving athermalization of the lens 10 through the desired spectrum of 450 nm-650 nm.

The third optical group 40 has a positive overall power and is configured to further converge the light from the second optical group 30 and to focus the light onto the focal plane array 60. The third optical group 30 includes optical elements 41, 42, and 43 having a negative optical power, a positive optical power, and a positive optical power respectively. The first and second optical elements 41 42 of the third optical group 40 are shaped as negative meniscus lenses whose concave surfaces faces toward the object. The third optical element 43 is a double convex lens. The mutual configuration of the third optical group elements corrects the lens 10 for field curvature and astigmatism. In some embodiments the first surface 42a of the second optical element 42 is aspherical so as to correct residual coma, astigmatism and distortion across the field of view while achieving near telecentricity.

The mutual combination of glasses refractive indices and Abbe numbers of the optical elements in the optical groups 20, 30 and 40 provides achromatic correction of the lens 10. The axial color is corrected. Moreover the combination of partial dispersions of the glasses used for the optical elements provides apochromatic correction, i.e. correction of the secondary color in the lens 10. The mutual combination of changes of refractive index with temperature of the optical elements provides athermalization of the lens 10.

In the embodiment of FIG. 1, the optical groups 20, 30, 40 and their constituent optical elements satisfy the following relations.

$0.09 < F'_{10}/F'_{20} < 0.14$ $0.8 < F'_{10}/F'_{30} < 1.2$ $0.1 < F'_{10}/F'_{40} < 0.15$ $0.65 < n_{21}/n_{22} < 0.95$ $0.75 < n_{21}/n_{31} = n_{21}/n_{35} = n_{21}/n_{32} = n_{21}/n_{34} < 0.95$ $1.05 < n_{31}/n_{33} < 1.3$ $0.95 < n_{31}/n_{36} < 1.35$ $0.75 < n_{36}/n_{37} < 1.1$ $0.85 < n_{21}/n_{41} < 1.15$ $0.65 < n_{41}/n_{42} < 0.9$ $0.7 < n_{41}/n_{43} < 0.95$ $1.35 < V_{21}/V_{22} < 1.65$ $1.45 < V_{21}/V_{31} = V_{21}/V_{35} < 1.7$ $0.95 < V_{31}/V_{32} = V_{35}/V_{34} < 1.1$ $0.9 < V_{21}/V_{33} < 1.1$ $0.9 < V_{21}/V_{36} < 1.1$ $1.55 < V_{21}/V_{37} < 1.75$ $0.55 < V_{21}/V_{41} < 0.75$ $2.4 < V_{21}/V_{42} < 2.8$ $1.5 < V_{21}/V_{43} < 1.9$ $0.0025 < P_{41}/V_{41} < 0.0035$ $0.095 < P_{42}/V_{42} < 0.0135$ $0.2 < dn/dT_{21}/dn/dT_{22} < 0.35$ $0.35 < dn/dT_{21}/dn/dT_{31} = dn/dT_{21}/dn/dT_{35} < 0.55$ $0.9 < dn/dT_{21}/dn/dT_{33} < 1.1$ $0.9 < dn/dT_{21}/dn/dT_{36} < 1.1$ $0.3 < dn/dT_{21}/dn/dT_{37} < 0.4$ $-0.15 < dn/dT_{21}/dn/dT_{41} < -0.09$ $0.9 < dn/dT_{21}/dn/dT_{42} < 1.25$ $0.18 < dn/dT_{21}/dn/dT_{43} < 0.25$ wherein:

F'$_{10}$ is the focal length of the lens 10;

F'$_{20}$, F'$_{30}$ and F'$_{40}$ are focal lengths of the first, the second and the third optical groups 20, 30 and 40;

n$_{21}$ and n$_{22}$ are refractive indices for the optical elements 21 and 22 of the first optical group;

n$_{31}$, n$_{32}$, n$_{33}$, n$_{34}$, n$_{35}$, n$_{36}$ and n$_{37}$ are refractive indices for the optical elements 31, 32, 33, 34, 35, 36 and 37 of the second optical group 30;

n$_{41}$, n$_{42}$ and n$_{43}$ are refractive indices for the optical elements 41, 42 and 43 of the third optical group 40;

V$_{21}$ and V$_{22}$ are Abbe numbers for the optical elements 21 and 22 of the first optical group 20;

V$_{31}$, V$_{32}$, V$_{33}$, V$_{34}$, V$_{35}$, V$_{36}$ and V$_{37}$ are Abbe numbers for the optical elements 31, 32, 33, 34, 35, 36 and 37 of the second optical group 30;

V$_{41}$, V$_{42}$, and V$_{43}$ are Abbe numbers for the optical elements 41, 42, and 43 of the third optical group 40;

P$_{41}$ is the partial dispersion for the optical element 41 of the third optical group 40;

P$_{42}$ is the partial dispersion for the optical element 42 of the third optical group 40;

dn/dT$_{21}$ is the refractive index change with temperature for the first optical element 21 of the first optical group 20;

dn/dT$_{22}$ is the refractive index change with temperature for the second optical element 22 of the first optical group 20;

dn/dT$_{31}$ is the refractive index change with temperature for the first optical element 31 of the second optical group 30;

dn/dT$_{33}$ is the refractive index change with temperature for the third optical element 33 of the second optical group 30;

dn/dT$_{34}$ is the refractive index change with temperature for the fourth optical element 34 of the second optical group 30;

dn/dT$_{35}$ is the refractive index change with temperature for the fifth optical element 35 of the second optical group 30;

dn/dT$_{36}$ is the refractive index change with temperature for the sixth optical element 36 of the second optical group 30;

dn/dT$_{37}$ is the refractive index change with temperature for the seventh optical element 37 of the second optical group 30;

dn/dT$_{41}$ is the refractive index change with temperature for the first optical element 41 of the third optical group 40;

dn/dT$_{42}$ is the refractive index change with temperature for the second optical element 42 of the third optical group 40; and dn/dT$_{43}$ is the refractive index change with temperature for the third optical element 43 of the third optical group 40.

The selection of the optical powers of the optical groups and elements, the selection of the refractive indices, the Abbe numbers, and the partial dispersions of the glasses as well as their dn/dT values, provides a high resolution imaging lens with chromatic and apochromatic correction while the defocusing caused by changes in temperature is less than the depth of focus of the lens.

Figure 3:
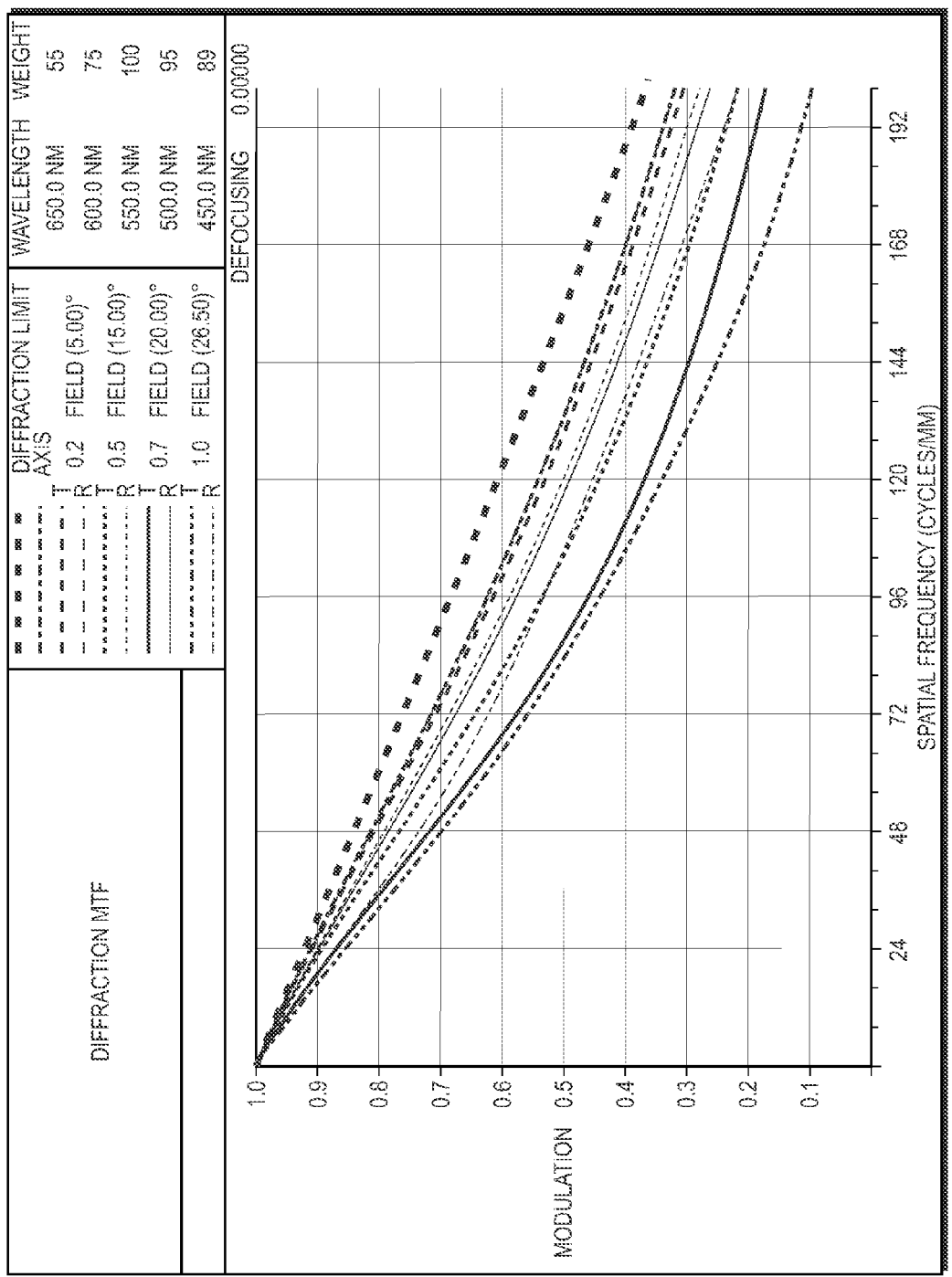
FIG. 3 is a graph presenting MTF data for the embodiment of FIG. 1.

Wave front and MTF data for the embodiment of FIG. 1 are presented in FIG. 2 and FIG. 3 respectively. The wave front is well corrected over the whole spectrum. The polychromatic MTF shows good resolution and contract over the entire field.

Figure 4:
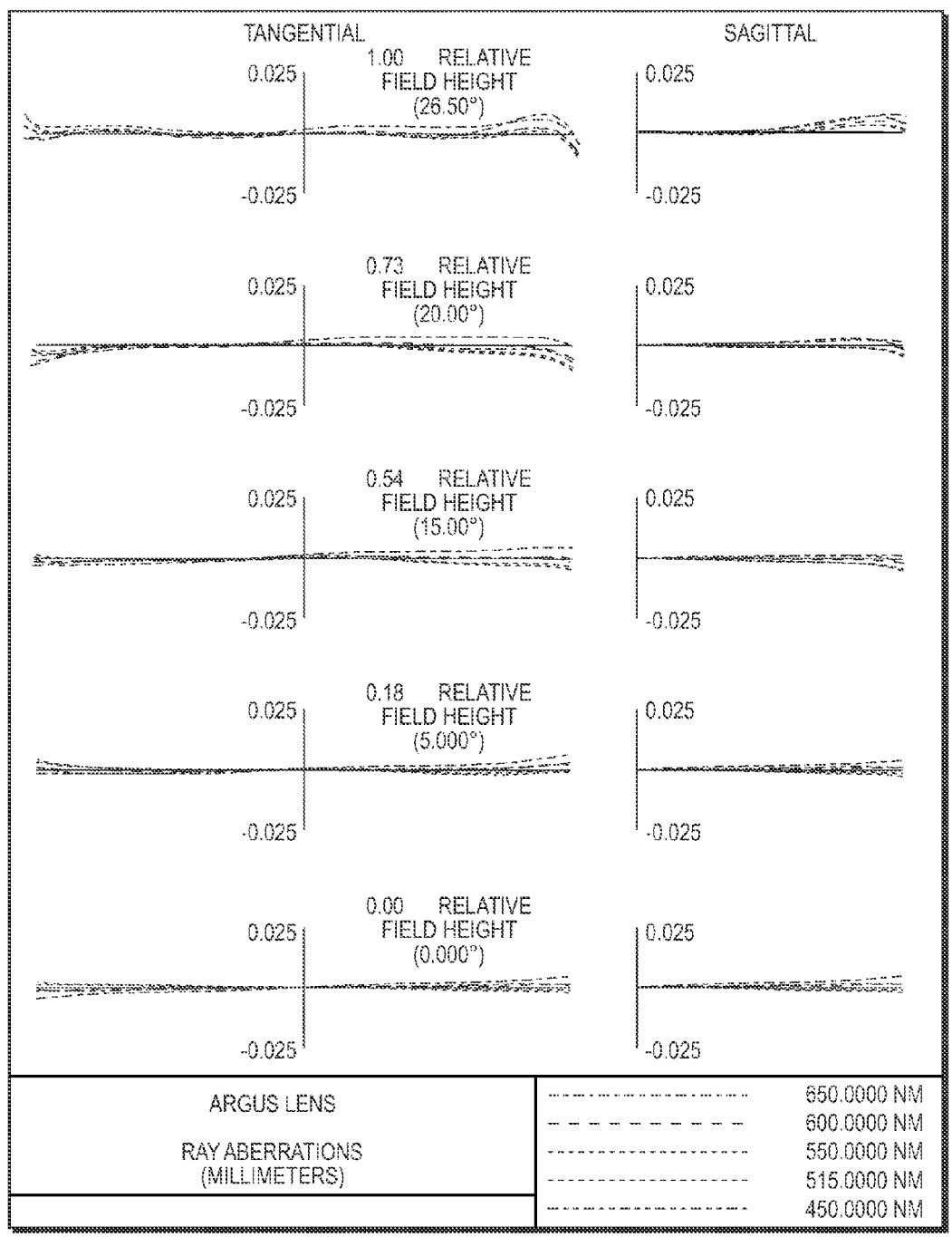
FIG. 4 includes a plurality of graphs presenting RIM RAY curves for the embodiment of FIG. 1.
Figure 5A:
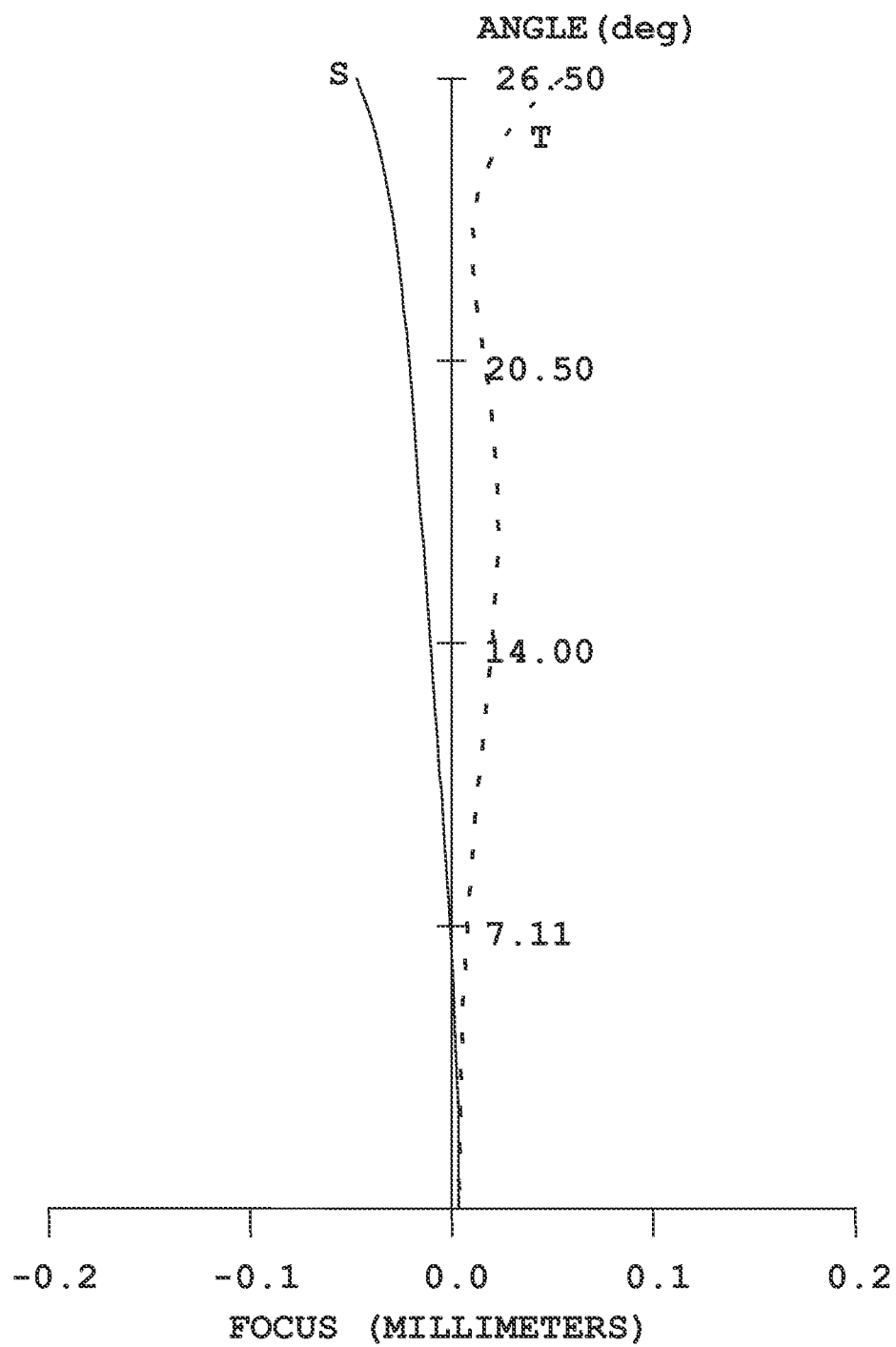
FIG. 5A presents a graph of field aberration data for the embodiment of FIG. 1.
Figure 5B:
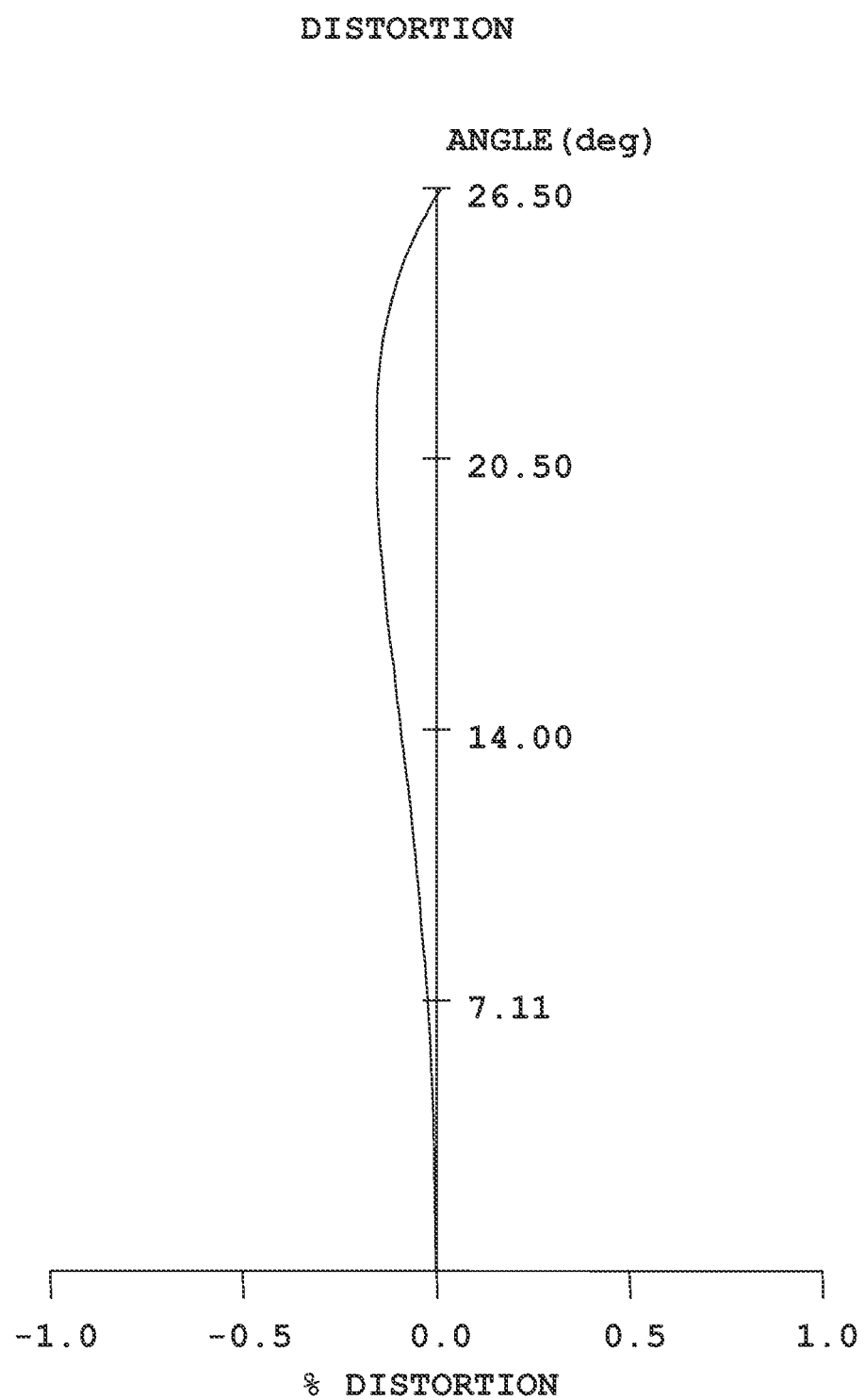
FIG. 5B presents a graph of distortion data for the embodiment of FIG. 1.
Figure 6:
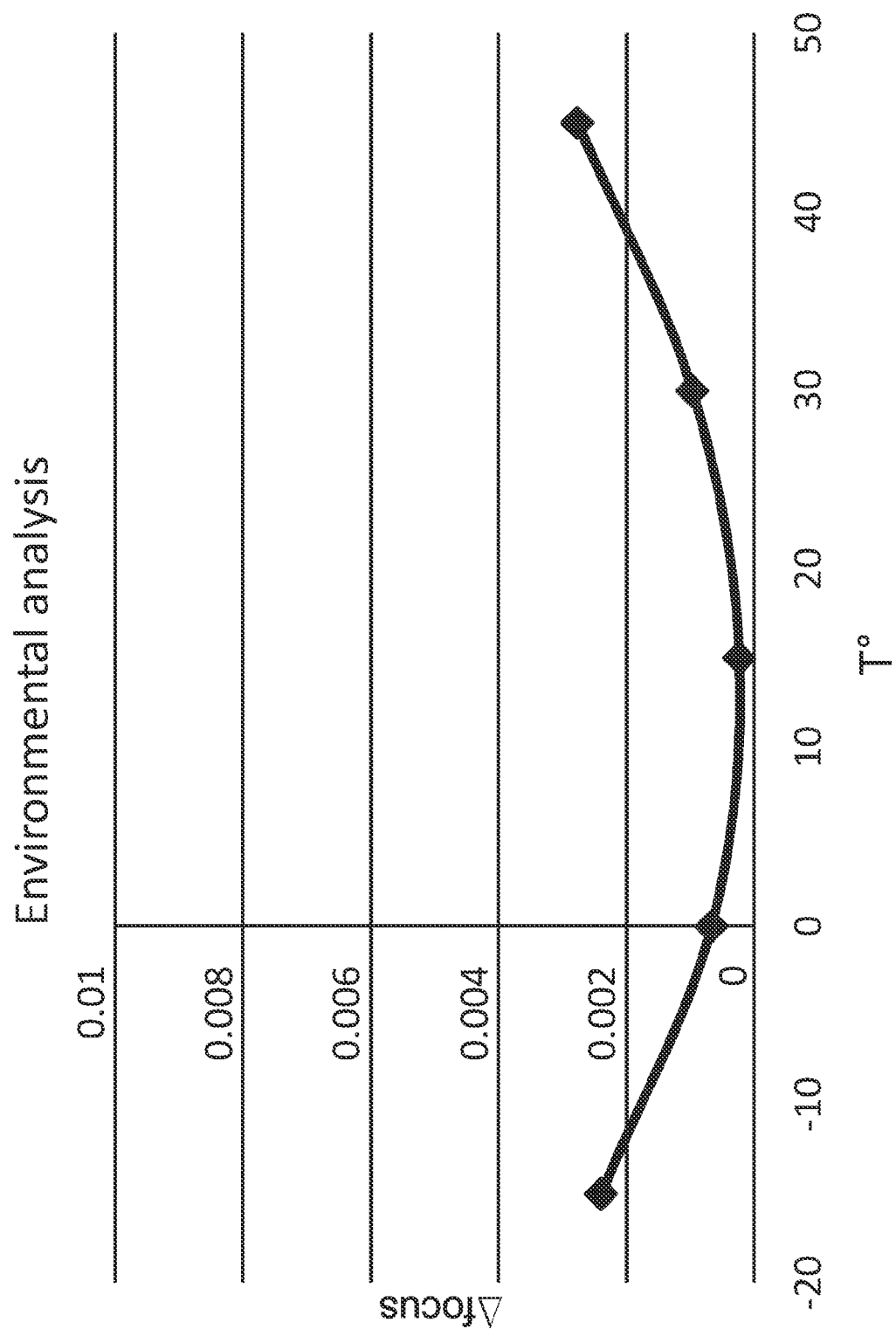
FIG. 6 is a graph presenting environmental analysis for the embodiment of FIG. 1.

RIM RAY curves for the embodiment of FIG. 1 are presented in FIG. 4. They show the spherical aberration, coma and chromatic correction over the wavelength range of 450 nm-650 nm. Astigmatism data is presented in FIG. 5A, and distortion data is presented in FIG. 5B. The field is flat and the distortion is corrected to less than 0.2% over the entire field. The change of the focus with temperature is presented in FIG. 6. The amount of defocus over the temperature range of −15° to 45° is 0.0025 mm, which is almost 20 times less than the depth of focus of 0.045 mm. The lack of telecentricity is less than 10.7° across the field. A prescription of the lens 10 is presented in FIG. 7. The optical materials include optical glass and CaF2 materials that are common and widely available commercially.

Figure 8:
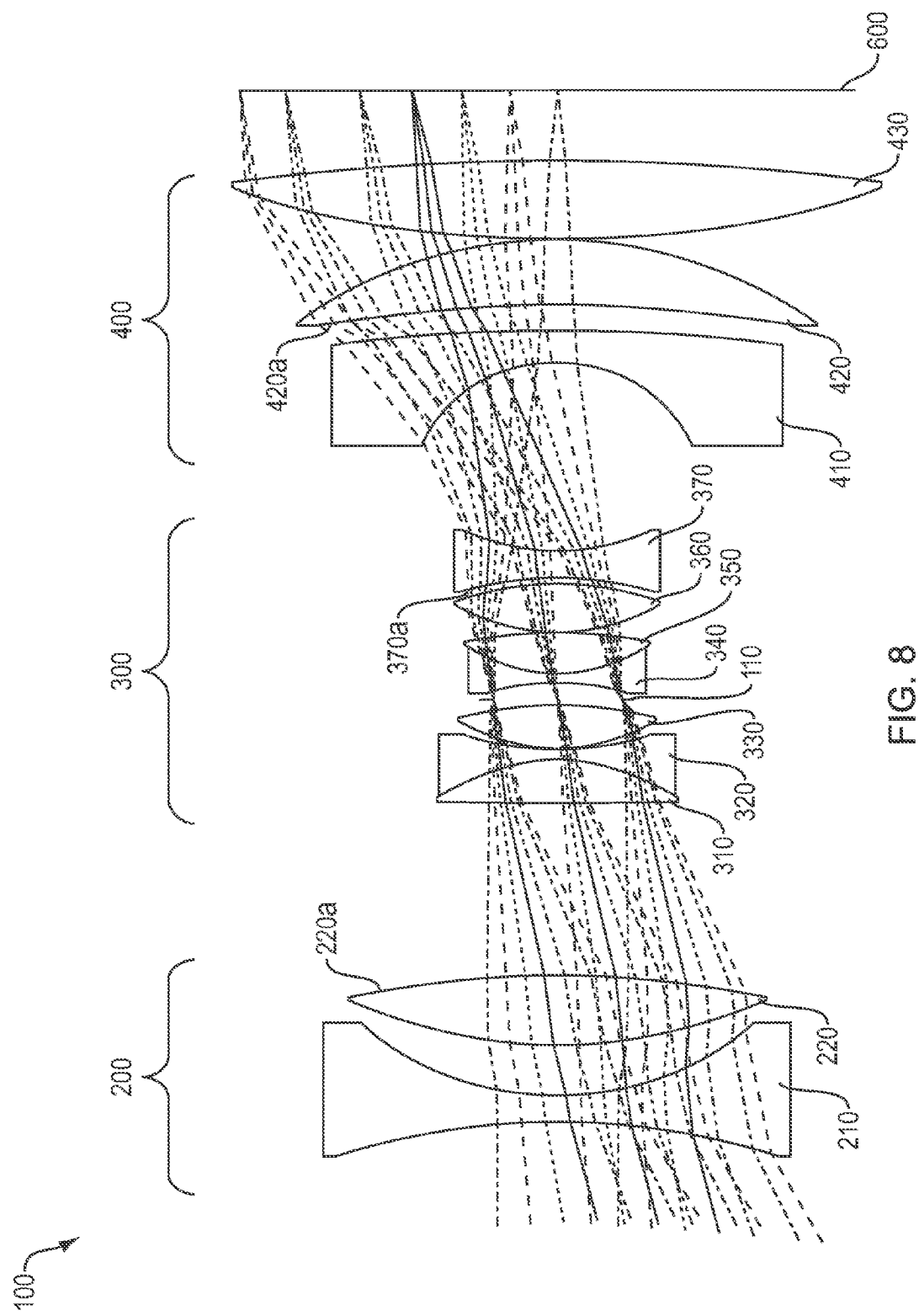
FIG. 8 is a cross sectional side view illustrating a second embodiment of the present invention.

FIG. 8 is a cross-sectional illustration of a second embodiment of the lens 100 of the present invention. This embodiment is essentially identical to the embodiment of FIG. 1, except for the specific relations that the optical elements satisfy. In particular, the lens 100 includes a first optical group 200, a second optical group 300 and a third optical group 400 in order from the object to the image plane. The aperture stop 110 is positioned inside the second optical group 300. An image of a distant object is formed on a focal plane array 600. In embodiments, the focal plane array incorporates CMOS with micro lenses, 2×2 Bayer filter geometry, and 1.8 Giga pixels. In other applications the image surface 600 may constitute CCD or a direct viewing screen.

In the embodiment of FIG. 8 the first optical group 200 has an overall negative optical power and is configured to receive light from a remote object and to direct the diverged light onto the second optical group 300. The first optical group 200 includes two optical elements 210 and 220, having negative and positive optical powers respectively. As seen in FIG. 8, the first optical element 210 of the first optical group 200 has a negative optical power and is a double concave lens. The second optical element 220 has a positive optical power and is double convex lens. The second surface 220a of the second element 220 of the first optical group may be aspherical so as to reduce the F number of the lens 100. The mutual configuration of the two optical elements 210, 220 of the first optical group 200 corrects the lens for pupil spherical aberration, spherical aberration, coma and astigmatism without introducing a distortion, while satisfying relationships required among the optical elements to achieve high resolution of the lens 100.

The second optical group 300 has a positive overall optical power and is configured to further converge light from the first optical group 200 and to direct diverged light onto the third optical group 40. The second optical group 200 includes seven optical elements 310, 320, 330, 340, 350, 360, and 370, having a positive optical power, a negative optical power, a positive optical power, a negative optical power, a positive optical power, a positive optical power and a negative optical power respectively. The aperture stop 110 is located within the second optical group 300 between optical elements 330 and 340. The position of the aperture stop inside the second optical group allows correction of the telecentricity and improves the compactness of the lens 10. Optical elements 310 and 320 and optical elements 340 and 350 may be cemented to one another as explained in more detail below.

The first optical element 310 of the second optical group 300 is a double convex lens, the second optical element 320 is a double concave lens, the third optical element 330 is a double convex lens, the fourth optical element 34 is a double concave lens, the fifth optical element 350 is a double convex lens, the sixth optical element 360 is a double convex lens, and the seventh optical element 370 is a double concave lens.

As mentioned supra, the first optical element 310 and the second optical element 320 of the second optical group 300 may be cemented to one another for the axial and secondary color correction (apochromatic correction) in the lens 100. Optical elements 340 and 350 may be cemented to one another for the same reason. In various embodiments the first surface 370a of the seventh optical element 370 is spherical so as to compensate for residual monochromatic aberrations across the field of view.

The mutual configuration and choice of glasses of the elements in the second optical group 300 corrects the lens for first order chromatic aberrations, spherical aberration, coma, and astigmatism, while achieving athermalization of the lens 100 through the desired spectrum of 450 nm-650 nm.

The third optical group 400 has a positive overall power and is configured to further converge the light from the second optical group 300 and to focus the light onto the focal plane array 600. The third optical group 30 includes optical elements 410, 420, and 430 having a negative optical power, a positive optical power, and a positive optical power respectively. The first and second optical elements 410 420 of the third optical group 400 are shaped as negative meniscus lenses whose concave surfaces faces toward the object. The third optical element 430 is a double convex lens. The mutual configuration of the third optical group elements corrects the lens 100 for field curvature and astigmatism. In some embodiments the first surface 420a of the second optical element 420 is aspherical so as to correct residual coma, astigmatism and distortion across the field of view while achieving near telecentricity.

The mutual combination of glasses refractive indices and Abbe numbers of the optical elements in the optical groups 200, 300, and 400 provides achromatic correction of the lens 100. The axial color is corrected. Moreover the combination of partial dispersions of the glasses used for the optical elements provides apochromatic correction, i.e. correction of the secondary color in the lens 100. The mutual combination of changes of refractive index with temperature of the optical elements provides athermalization of the lens 100.

In the embodiment of FIG. 8, the optical groups 200, 300, 400 and their constituent optical elements satisfy the following relations.

$$-0.1 < F'_{100}/F'_{200} < -0.07$$

$$1.35 < F'_{100}/F'_{300} < 1.55$$

$$0.17 < F'_{100}/F'_{400} < 0.19$$

$$0.70 < n_{210}/n_{220} < 0.90$$

$$0.80 < n_{210}/n_{310} = n_{210}/n_{350} = n_{210}/n_{320} = n_{210}/n_{340} < 1$$

$$1 < n_{310}/n_{330} < 1.25$$

$$0.9 < n_{310}/n_{360} < 1.3$$

$$0.65 < n_{360}/n_{370} < 1.05$$

$$0.80 < n_{210}/n_{410} < 1.1$$

$$0.7 < n_{410}/n_{420} < 0.85$$

$$0.8 < n_{410}/n_{430} < 0.95$$

$$1.55 < V_{210}/V_{220} < 1.85$$

$$1.4 < V_{210}/V_{310}, V_{210}/V_{350} < 1.65$$

$$0.85 < V_{310}/V_{320}, V_{350}/V_{340} < 1.15$$

$$0.85 < V_{210}/V_{330} < 1$$

$$0.95 < V_{210}/V_{360} < 1.1$$

$$1.6 < V_{210}/V_{370} < 1.8$$

$$0.85 < V_{210}/V_{410} < 1.2$$

$$2.2 < V_{210}/V_{420} < 2.6$$

$$1.45 < V_{210}/V_{430} < 1.75$$

$$0.0035 < P_{410}/V_{410} < 0.0055$$

$$0.1 < P_{420}/V_{420} < 0.015$$

$$0.15 < dn/dT_{210}/dn/dT_{220} < 0.3$$

$$0.4 < dn/dT_{210}/dn/dT_{310} = dn/dT_{210}/dn/dT_{305} < 0.6$$

$$0.85 < dn/dT_{210}/dn/dT_{330} < 1.05$$

$$0.8 < dn/dT_{210}/dn/dT_{360} < 1.1$$

$$0.35 < dn/dT_{210}/dn/dT_{370} < 0.5$$

$$0.9 < dn/dT_{210}/dn/dT_{410} < 1.2$$

$$0.85 < dn/dT_{210}/dn/dT_{420} < 1.3$$

$$0.15 < dn/dT_{210}/dn/dT_{430} < 0.3$$

where:
$F'_{100}$ is the focal length of the lens 100;
$F'_{200}$, $F'_{300}$ and $F'_{400}$ are focal lengths of the first, the second and the third optical groups 200, 300 and 400;
$n_{210}$ and $n_{220}$ are refractive indices for the optical elements 210 and 220 of the first optical group;
$n_{310}$, $n_{320}$, $n_{330}$, $n_{340}$, $n_{350}$, $n_{360}$ and $n_{370}$ are refractive indices for the optical elements 310, 320, 330, 340, 350, 360 and 370 of the second optical group 300;
$n_{410}$, $n_{420}$ and $n_{430}$ are refractive indices for the optical elements 410, 420 and 430 of the third optical group 400;
$V_{210}$ and $V_{220}$ are Abbe numbers for the optical elements 410 and 420 of the first optical group 200;
$V_{310}$, $V_{320}$, $V_{330}$, $V_{340}$, $V_{350}$, $V_{360}$ and $V_{370}$ are Abbe numbers for the optical elements 310, 320, 330, 340, 35, 360 and 370 of the second optical group 300;
$P_{410}$ is the partial dispersion for the optical element 410 of the third optical group 400;
$P_{420}$ is the partial dispersion for the optical element 420 of the third optical group 400;
$dn/dT_{210}$ is the refractive index change with temperature for the first optical element 210 of the first optical group 200;
$dn/dT_{220}$ is the refractive index change with temperature for the second optical element 220 of the first optical group 200;
$dn/dT_{310}$ is the refractive index change with temperature for the first optical element 310 of the second optical group 300;
$dn/dT_{330}$ is the refractive index change with temperature for the third optical element 330 of the second optical group 300;
$dn/dT_{350}$ is the refractive index change with temperature for the fifth optical element 350 of the second optical group 300;
$dn/dT_{360}$ is the refractive index change with temperature for the sixth optical element 360 of the second optical group 300;
$dn/dT_{370}$ is the refractive index change with temperature for the seventh optical element 370 of the second optical group 300;
$dn/dT_{410}$ is the refractive index change with temperature for the first optical element 410 of the third optical group 400;
$dn/dT_{420}$ is the refractive index change with temperature for the second optical element 420 of the third optical group 400; and
$dn/dT_{430}$ is the refractive index change with temperature for the third optical element 430 of the third optical group 400.

The selection of the optical powers of the optical groups and elements, the selection of the refractive indices, the Abbe numbers, and the partial dispersions, of the glasses as well as their do/dT values, provides a high resolution imaging lens with chromatic and apochromatic correction while the defocusing caused by changes in temperature is less than the depth of focus of the lens.

Figure 10:
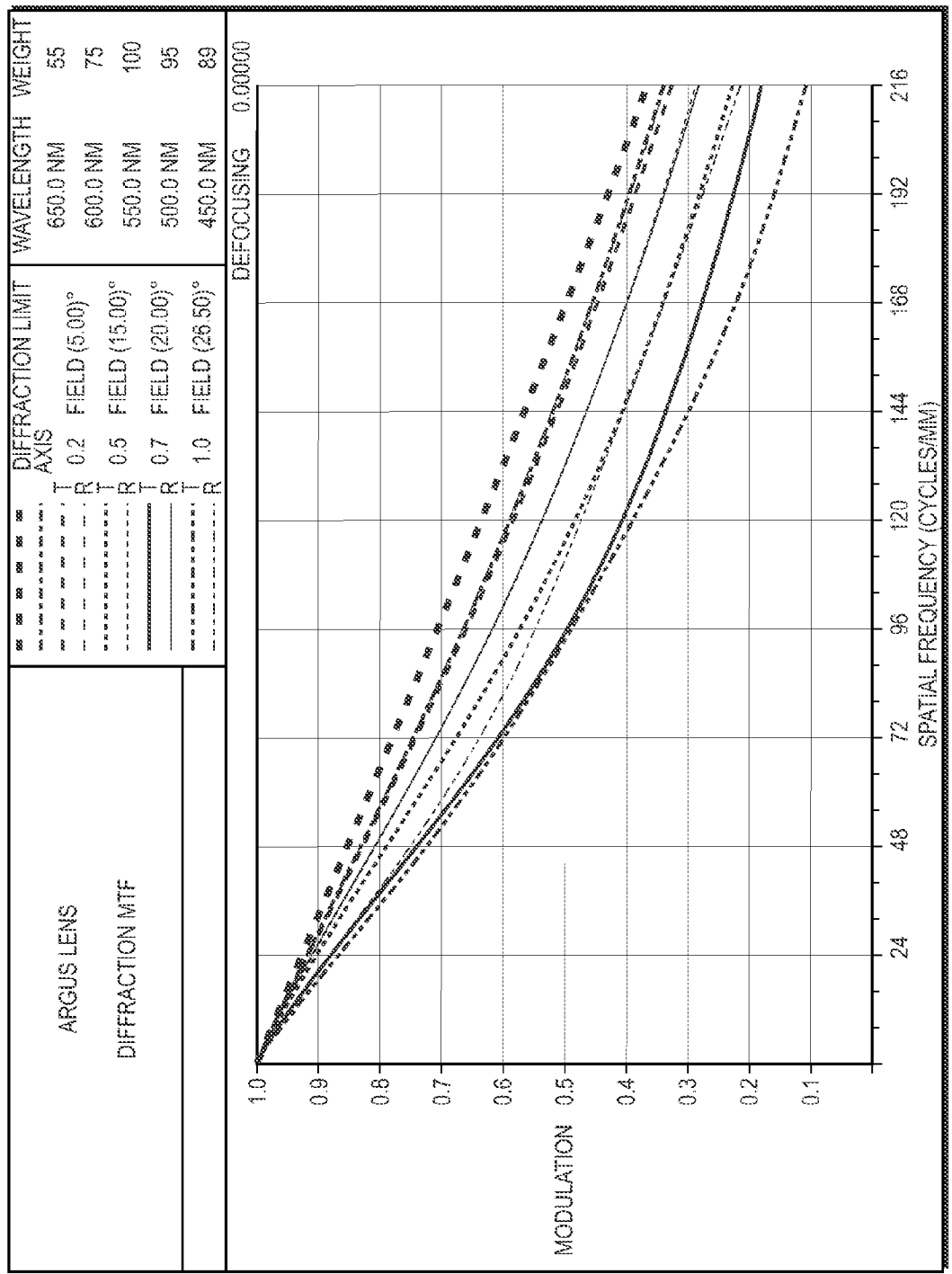
FIG. 10 is a graph presenting MTF data for the embodiment of FIG. 8.
Figure 11:
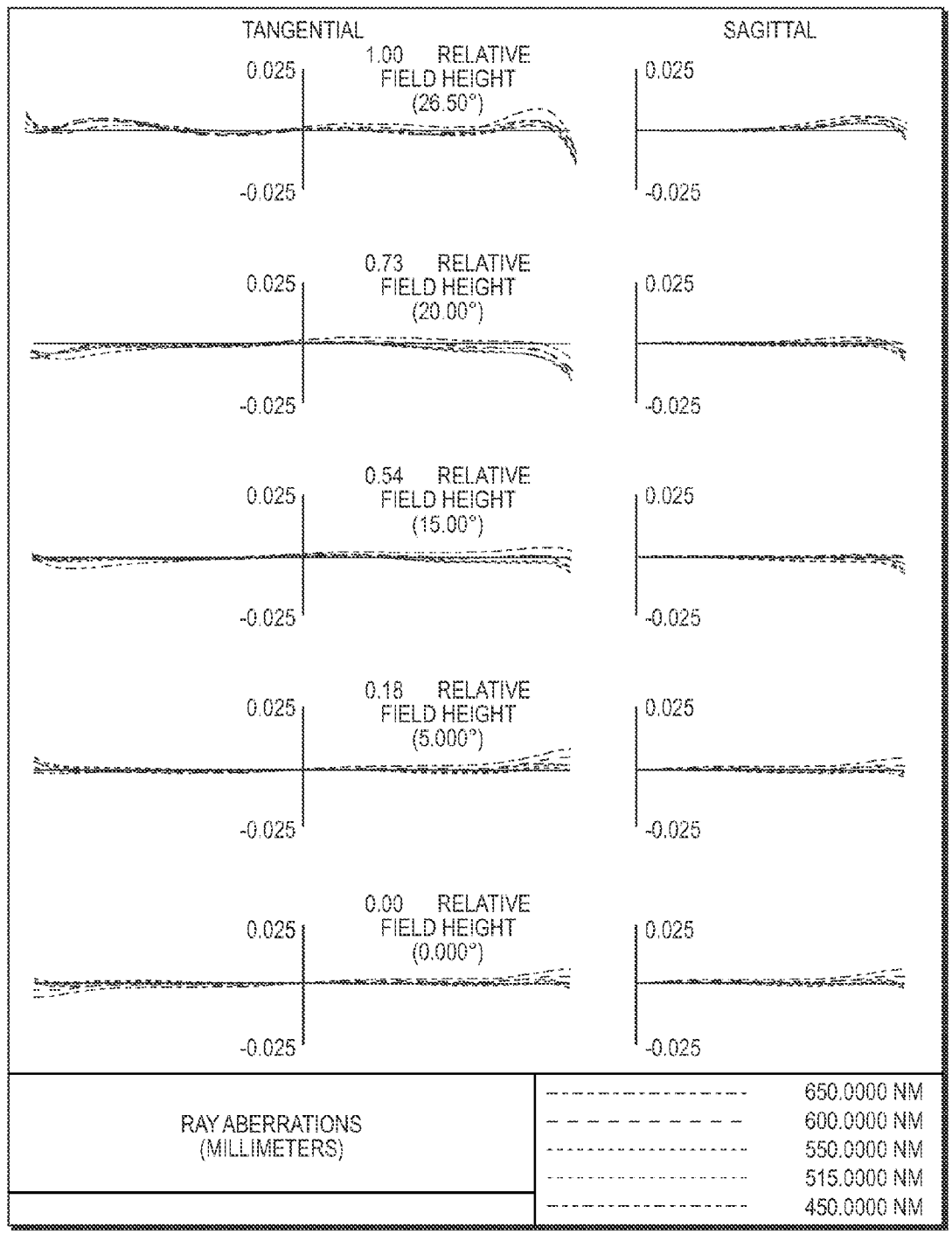
FIG. 11 includes a plurality of graphs presenting RIM RAY curves for the embodiment of FIG. 8.
Figure 12A:
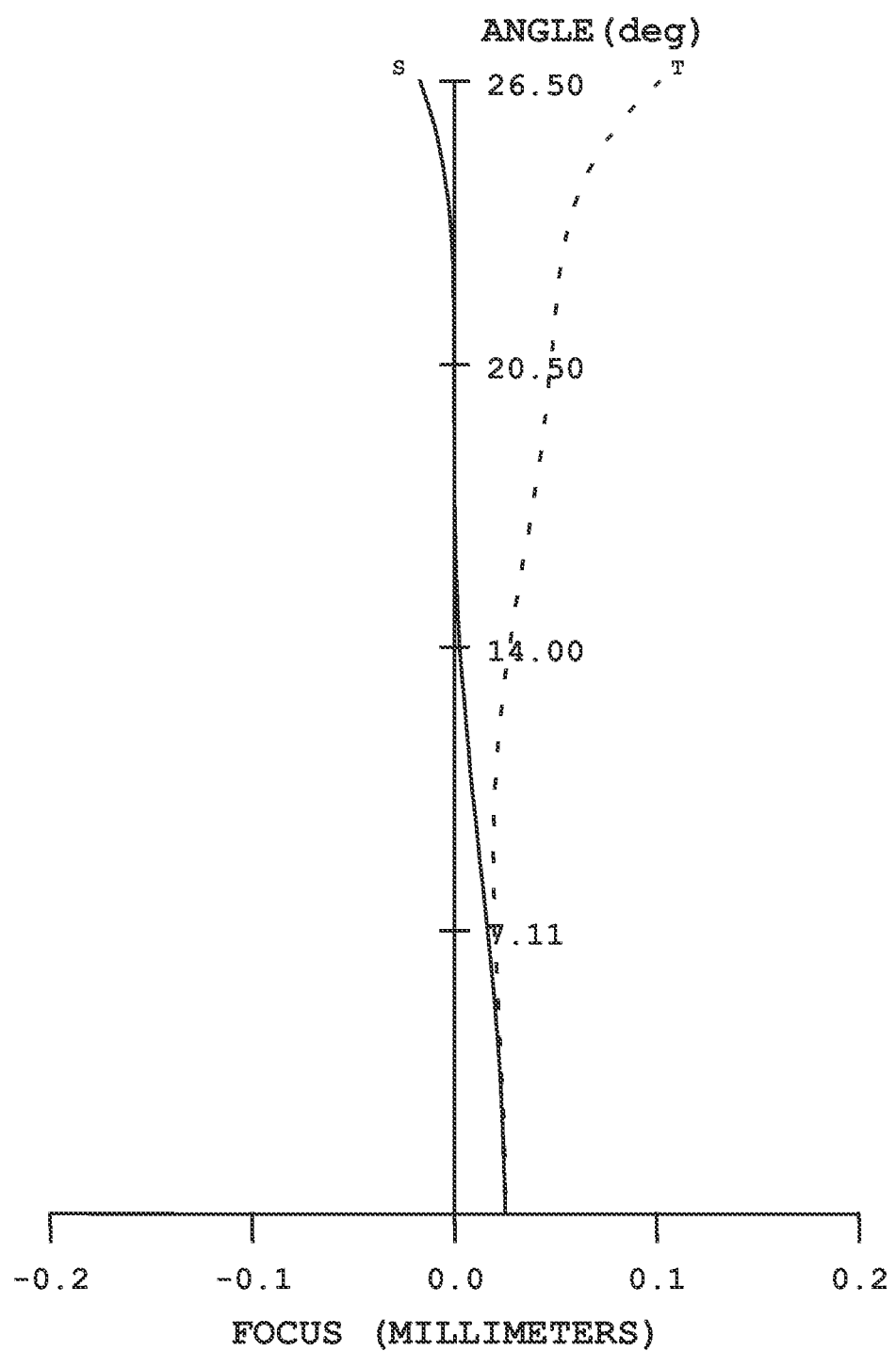
FIG. 12A presents a graph of field aberration data for the embodiment of FIG. 8.
Figure 12B:
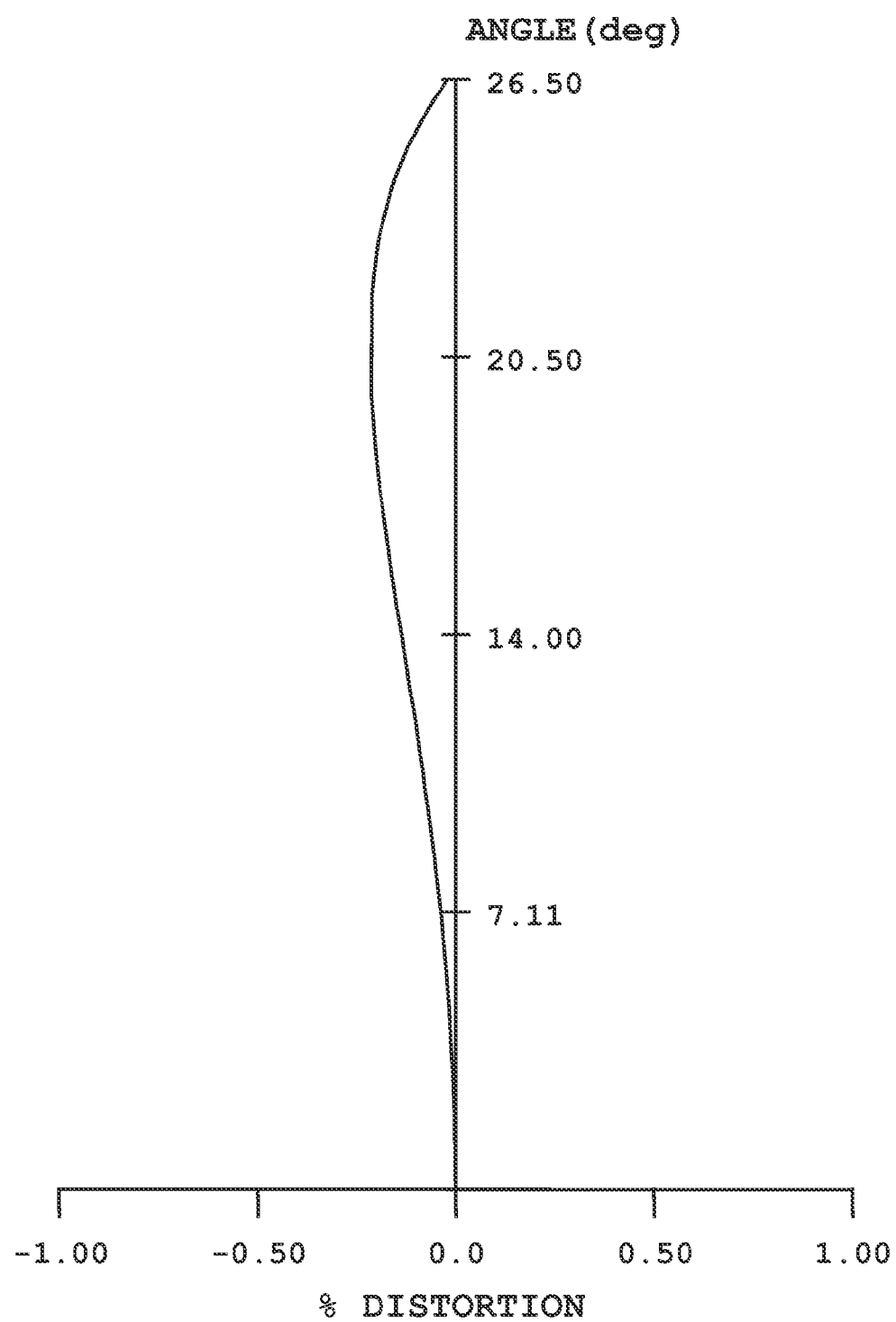
FIG. 12B presents a graph of distortion data for the embodiment of FIG. 8.

Wave front and MTF data for the embodiment of FIG. 8 is presented in FIG. 9 and FIG. 10 respectively. The wave front is well corrected over the whole spectrum and is polychromatic. The MTF shows good resolution and contract over the entire field. The RIM RAY curves in FIG. 11 show the spherical aberration, coma and chromatic correction over the wavelength range of 450 nm-650 nm. Astigmatism data is presented in FIG. 12A, and distortion data is presented in FIG. 12B. The field is flat and distortion is corrected to less than 0.3% over the entire field of view.

Figure 13:
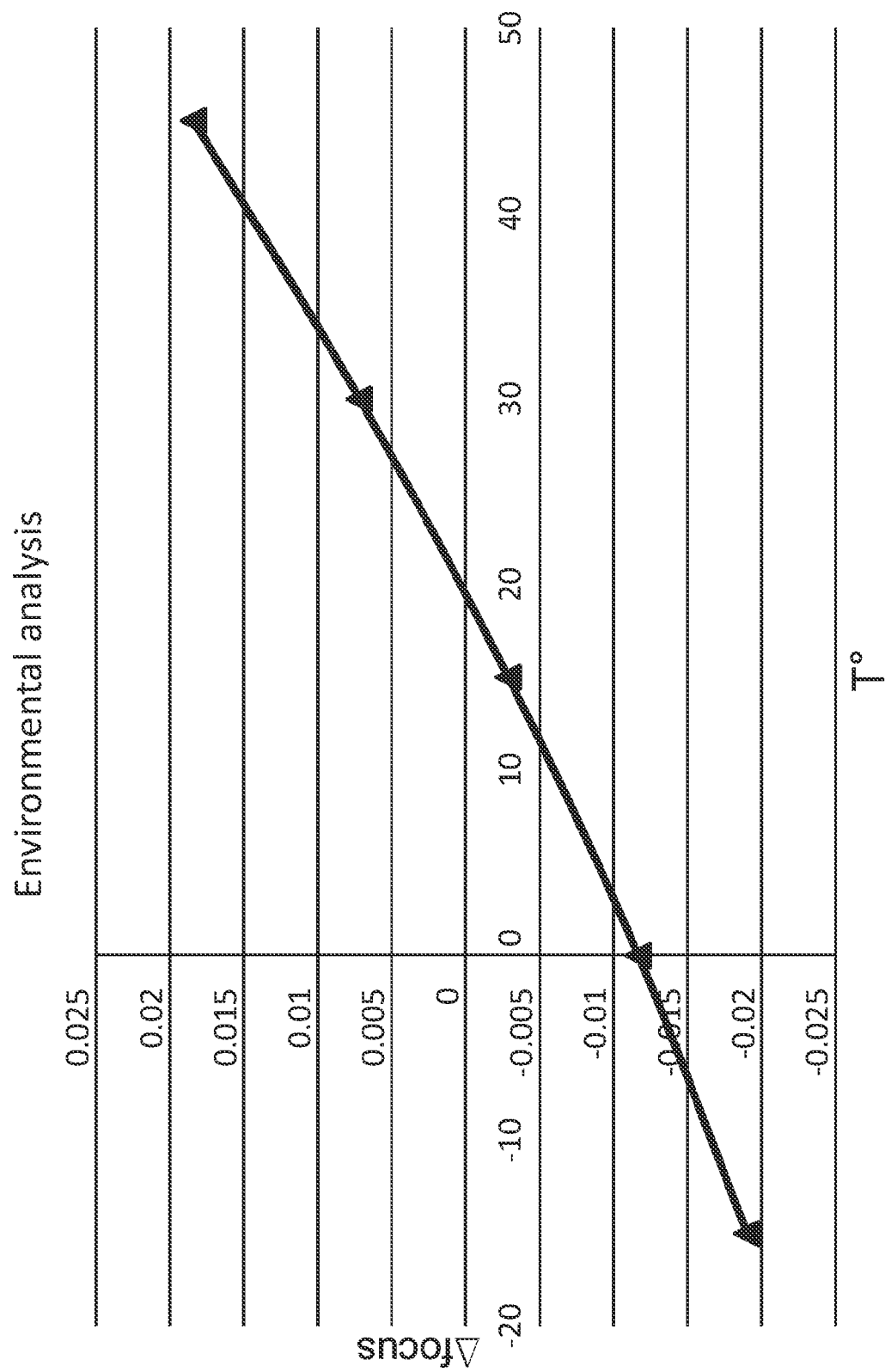
FIG. 13 is a graph presenting environmental analysis for the embodiment of FIG. 8.

The change of the focus with temperature is presented in FIG. 13. The defocus over the temperature range of −15° to 45° is 0.028 mm, which is 1.6 times less than depth of focus of 0.045 mm. Lack of telecentricity is less than 9.2° across the field of view. A prescription of the lens 100 is presented in FIG. 14. The optical materials used include optical glasses that are common and widely available commercially.

Figure 15:
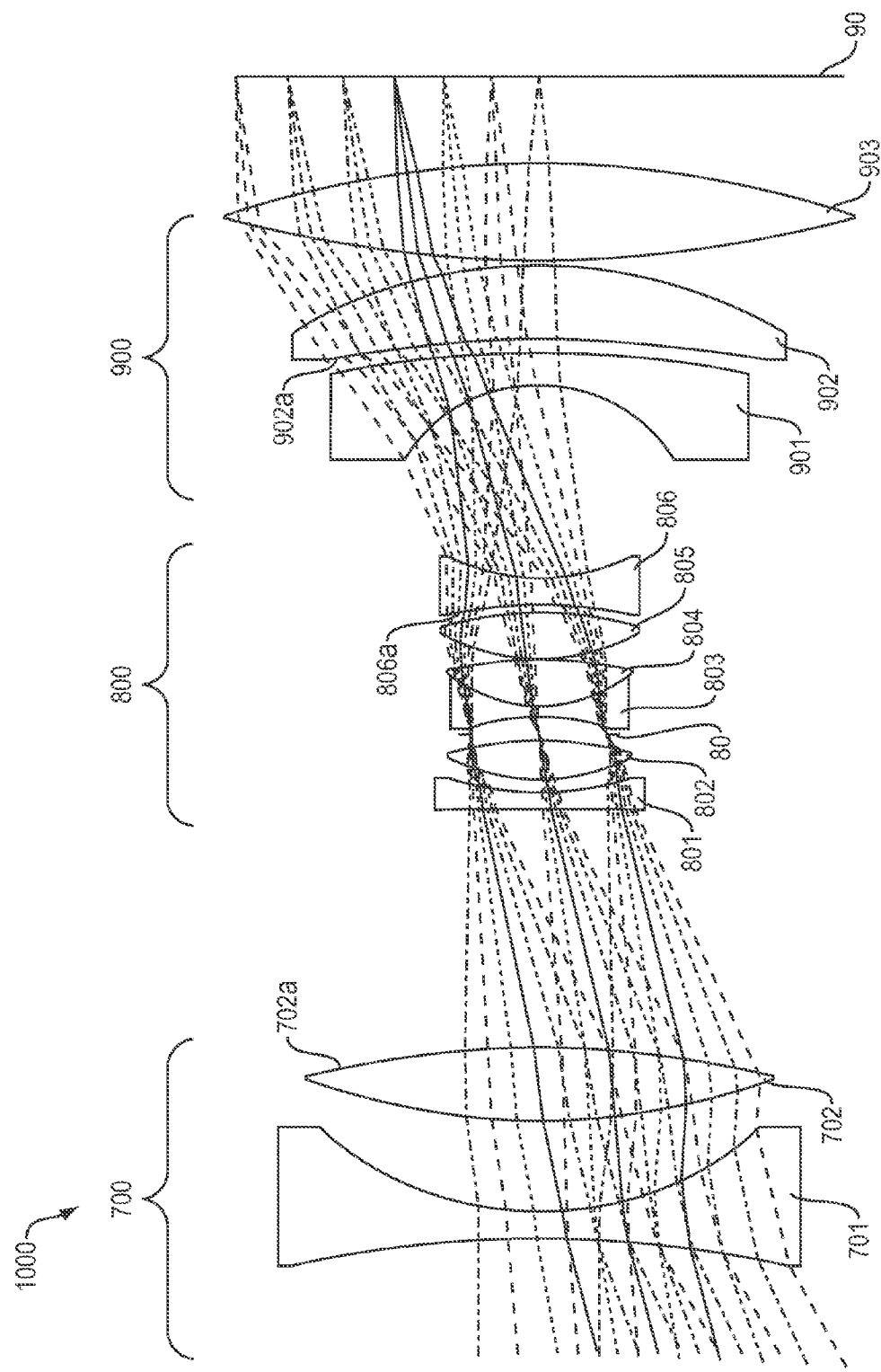
FIG. 15 is a cross sectional side view illustrating a third embodiment of the present invention.

FIG. 15 is a cross-sectional illustration of a third embodiment of the lens 1000 of the present invention. The lens 1000 includes a first optical group 700, a second optical group 800 and a third optical group 900 in the stated order from the object to the image plane. Aperture stop 80 is positioned inside the second optical group 800. An image of a distant object is formed on a focal plane array 90. In some embodiments, the focal plane array incorporates CMOS with micro lenses, 2×2 Bayer filter geometry, and 1.8 Giga pixels. In other embodiments the image surface 60 incorporates CCD or a direct viewing screen.

The first optical group 700 has an overall positive optical power and is configured to receive light from the remote object and to direct the converged light onto the second optical group 800. The first optical group 700 includes two optical elements 701 and 702, having negative and positive optical powers respectively. As shown in FIG. 15, the first optical element 701 of the first optical group 700 has a negative optical power and is a double concave lens. The second optical element 702 of the first optical group 700 has a positive optical power and is a double convex lens. In various embodiments, the second surface 702a of the second optical element 702 is aspherical so as to reduce the F number of the lens 1000. The mutual configuration of the two optical elements 701, 702 of the first optical group 700 provides correction of pupil spherical aberration, coma, and astigmatism without introducing a distortion, while satisfying relationships required among the optical elements that provide the required performance of the lens 700.

The second optical group 800 has a positive overall optical power and is configured to further converge light from the first optical group 700 and to direct the converged light onto the third optical group 900. The second optical group 800 includes six optical elements 801, 802, 803, 804, 805 and 806 having a negative optical power, a positive optical power, a negative optical power, a positive optical power, a positive optical power, and a negative optical power respectively. The aperture stop 80 is located between the optical elements 802 and 803. Elements 803 and 804 can be cemented to one another as described in more detail below. The first optical element 801 of the second optical group 800 is a single concave lens, the second optical element 802 is a double convex lens, the third optical element 803 is a double concave lens, the fourth and fifth optical elements 804 805 are double convex lenses, and the sixth optical element 806 is a double concave lens. The location of the aperture stop 80 inside the second optical group provides correction of telecentricity and compactness of the lens 1000.

Further, as mentioned supra, the third optical element 803 and the fourth optical element 804 of the second optical group 800 can be cemented to one another for axial and secondary color correction (apochromatic correction) of the lens 1000. In embodiments, the first surface 806a of the sixth optical element 806 is aspherical so as to compensate residual monochromatic aberrations across the field of view.

The mutual configuration and choices of glasses for the optical elements in the second optical group 800 provides correction of chromatic aberrations, spherical aberration and coma, and astigmatism through the desired wavelength range of 450 nm-650 nm, while achieving athermalization of the lens 1000.

The third optical group 900 has a positive overall power and is configured to further converge the light from the second optical group 800 and to focus the light onto the focal plane array 90. The third optical group includes optical elements 901, 902 and 903 having a negative optical power, a positive optical power, and a positive optical power respectively. The first optical element 901 of the third optical group 400 is shaped as a negative meniscus lens whose concave surface faces toward the object. The second optical element 902 of the third optical group is shaped as a positive meniscus lens whose concave surface faces toward the object. The third optical element 903 is a double convex lens. The mutual configuration of the third optical group elements provides correction of field curvature, distortion, and astigmatism across the field of view. In embodiments, the first surface 902a of the second optical element 902 is aspherical so as to correct residual coma, astigmatism and distortion while achieving near-telecentricity in the lens 1000.

The mutual combination of refractive indices and Abbe numbers of the optical elements in the optical groups 700, 800 and 900 provides achromatic and apochromatic correction of the lens 1000. The mutual combination of changes of refractive index with temperature provides athermalization of the lens 1000.

In the embodiment of FIG. 15, the optical groups 700, 800, 900 and their constituent optical elements satisfy the following relations.

$2.6 < F'_{1000}/F'_{700} < 3.4$ $2 < F'_{1000}/F'_{800} < 2.6$ $2.2 < F'_{1000}/F'_{900} < 2.7$ $0.65 < n_{701}/n_{702} < 0.95$ $0.75 < n_{701}/n_{801} = n_{701}/n_{803} = n_{701}/n_{804} = n_{701}/n_{806} < 1$ $0.95 < n_{801}/n_{802} = n_{801}/n_{805} < 1.25$ $0.90 < n_{701}/n_{901} < 1.15$ $0.7 < n_{901}/n_{902} < 0.9$ $0.75 < n_{801}/n_{903} < 0.95$ $1.35 < V_{701}/V_{702} < 1.7$ $1.4 < V_{701}/V_{801} = V_{701}/V_{803} = V_{701}/V_{806} < 1.8$ $0.45 < V_{801}/V_{802} = V_{801}/V_{805} = < 0.75$ $0.85 < V_{803}/V_{804} < 1.15$ $0.85 < V_{701}/V_{901} < 1.15$ $2.4 < V_{701}/V_{902} < 2.8$ $1.55 < V_{701}/V_{903} < 1.85$ $0.004 < P_{901}/V_{901} < 0.006$ $0.95 < P_{902}/V_{902} < 0.015$ $0.2 < dn/dT_{701}/dn/dT_{702} < 0.35$ $0.25 < dn/dT_{701}/dn/dT_{801} = dn/dT_{701}/dn/dT_{803} = dn/dT_{701}/dn/dT_{806} < 0.45$ $0.85 < dn/dT_{701}/dn/dT_{802} = dn/dT_{701}/dn/dT_{805} << 1.15$ $0.4 < dn/dT_{701}/dn/dT_{804} < 0.6$ $0.8 < dn/dT_{701}/dn/dT_{901} < 1.2$ $1 < dn/dT_{701}/dn/dT_{902} < 1.25$ $0.1 < dn/dT_{701}/dn/dT_{903} < 0.35$ where:

$F'_{1000}$ is the focal length of the lens 1000;

$F'_{700}$, $F'_{800}$ and $F'_{900}$ are focal lengths of the first, the second and the third optical groups 700, 800 and 900;

$n_{701}$ and $n_{702}$ are refractive indices for the optical elements 701 and 702 of the first optical group 700;

$n_{801}$, $n_{802}$, $n_{803}$, $n_{804}$, $n_{805}$ and $n_{806}$ are refractive indices for the optical elements 801, 802, 803, 804, 805 and 806 of the second optical group 800;

$n_{901}$, $n_{902}$ and $n_{903}$ are refractive indices for the optical elements 901, 902 and 903 of the third optical group 900;

$V_{701}$ and $V_{702}$ are Abbe numbers for the optical elements 701 and 702 of the first optical group 700;

$V_{801}$, $V_{802}$, $V_{803}$, $V_{804}$, $V_{805}$ and $V_{806}$ are Abbe numbers for the optical elements 801, 802, 803, 804, 805 and 806 of the second optical group 800;

$P_{901}$ is the partial dispersion for the optical element 901 of the third optical group 900;

$P_{902}$ is the partial dispersion for the optical element 902 of the third optical group 900;

$dn/dT_{701}$ is the refractive index change with temperature for the first optical element 701 of the first optical group 700;

$dn/dT_{702}$ is the refractive index change with temperature for the second optical element 702 of the first optical group 700;

$dn/dT_{801}$ is the refractive index change with temperature for the first optical element 801 of the second optical group 800;

$dn/dT_{802}$ is the refractive index change with temperature for the second optical element 802 of the second optical group 800;

$dn/dT_{803}$ is the refractive index change with temperature for the third optical element 803 of the second optical group 800;

$dn/dT_{804}$ is the refractive index change with temperature for the fourth optical element 804 of the second optical group 800;

$dn/dT_{805}$ is the refractive index change with temperature for the fifth optical element 805 of the second optical group 800;

$dn/dT_{806v}$ is the refractive index change with temperature for the sixth optical element 806 of the second optical group 800;

$dn/dT_{901}$ is the refractive index change with temperature for the first optical element 901 of the third optical group 900;

$dn/dT_{902}$ is the refractive index change with temperature for the second optical element 902 of the third optical group 900; and $dn/dT_{903}$ is the refractive index change with temperature for the third optical element 903 of the third optical group 900.

The selection of the optical powers of the optical groups and elements, the selection of the refractive indices, the Abbe numbers, and the partial dispersions, of the glasses as well as their do/dT values, provides a high resolution imaging lens with chromatic and apochromatic correction while the defocusing caused by changes in temperature is less than the depth of focus of the lens.

Figure 17:
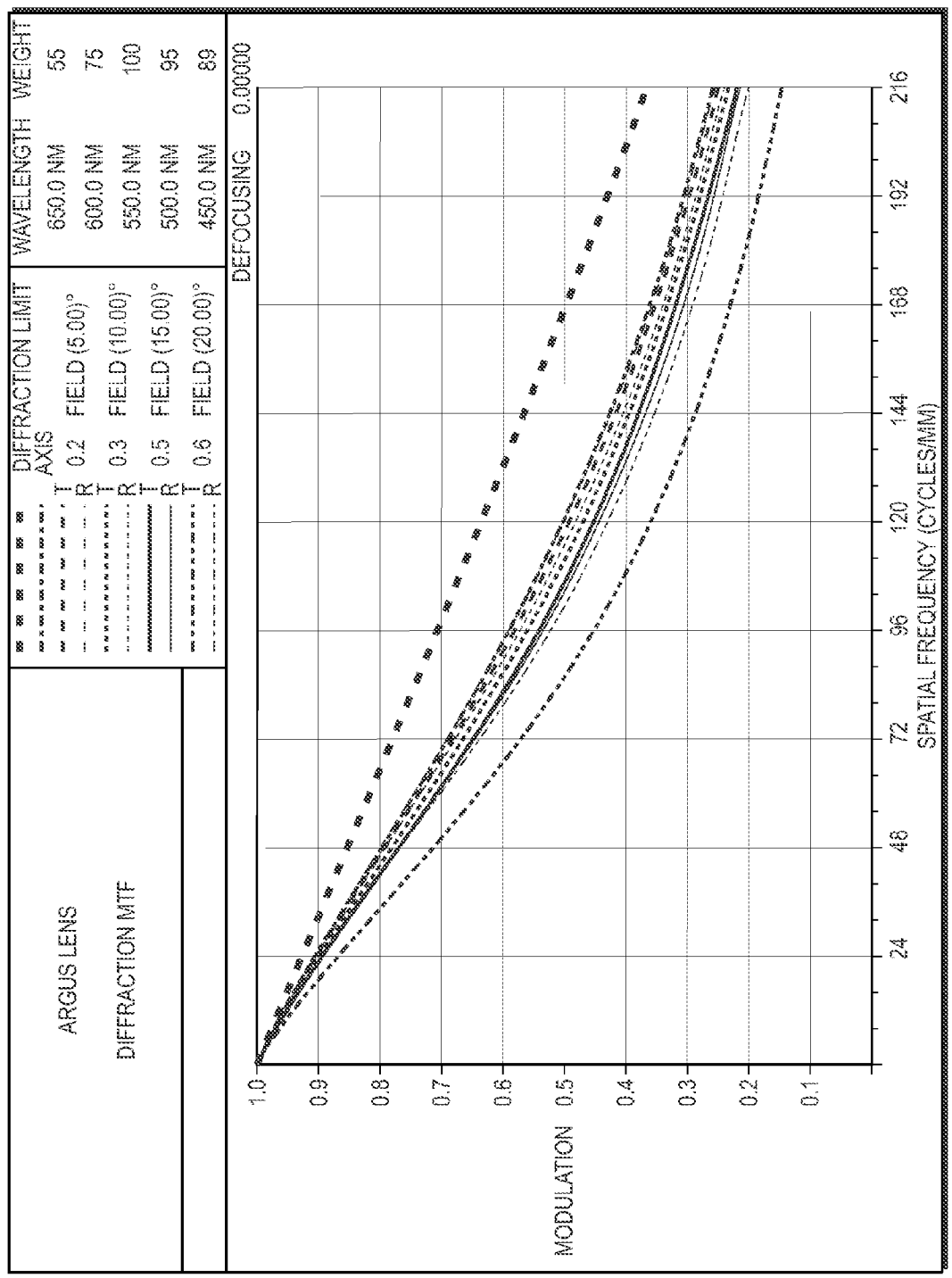
FIG. 17 is a graph presenting MTF data for the embodiment of FIG. 15.
Figure 18A:
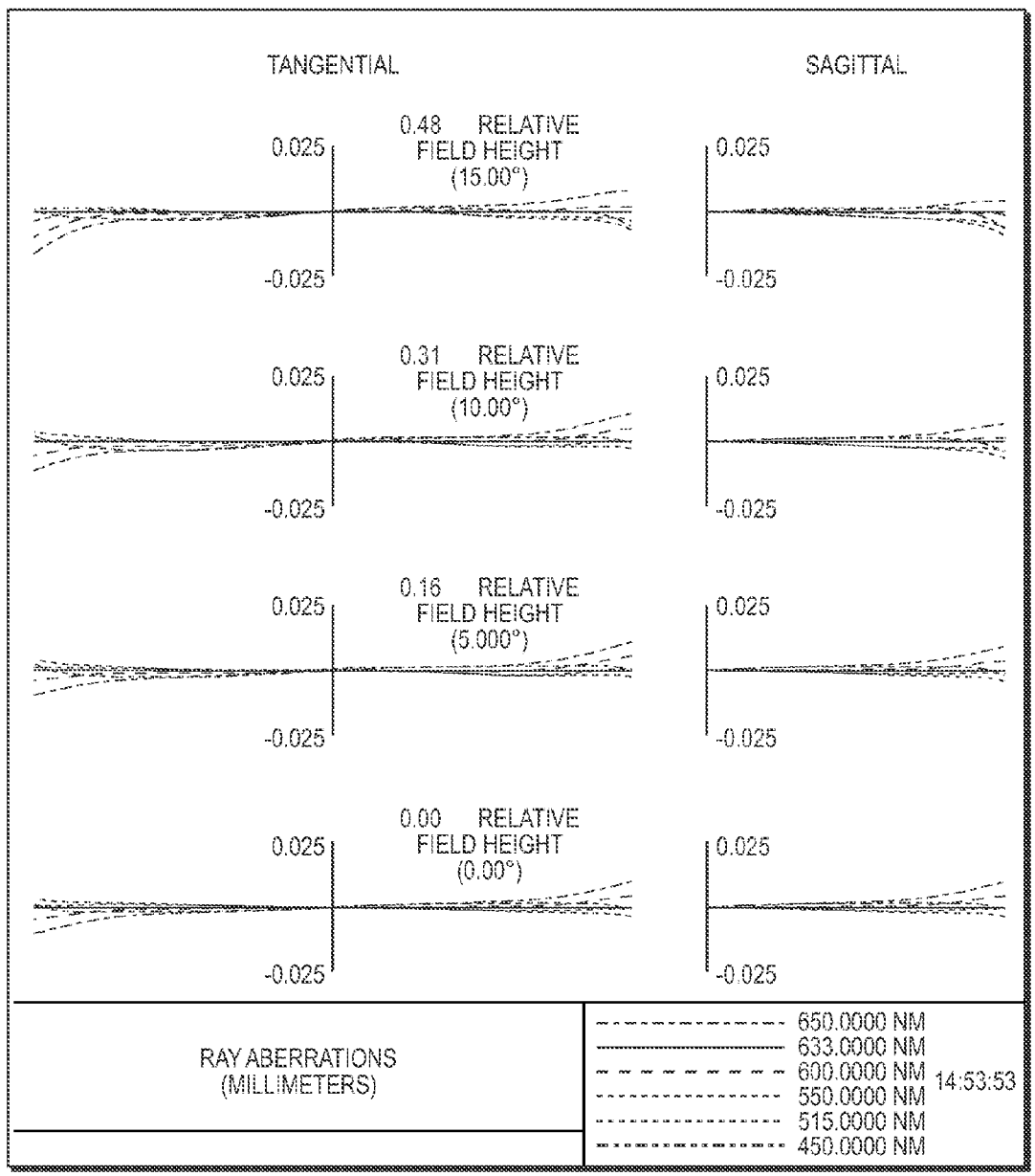
FIG. 18A includes a plurality of graphs presenting RIM RAY curves for the embodiment of FIG. 15.
Figure 18B:
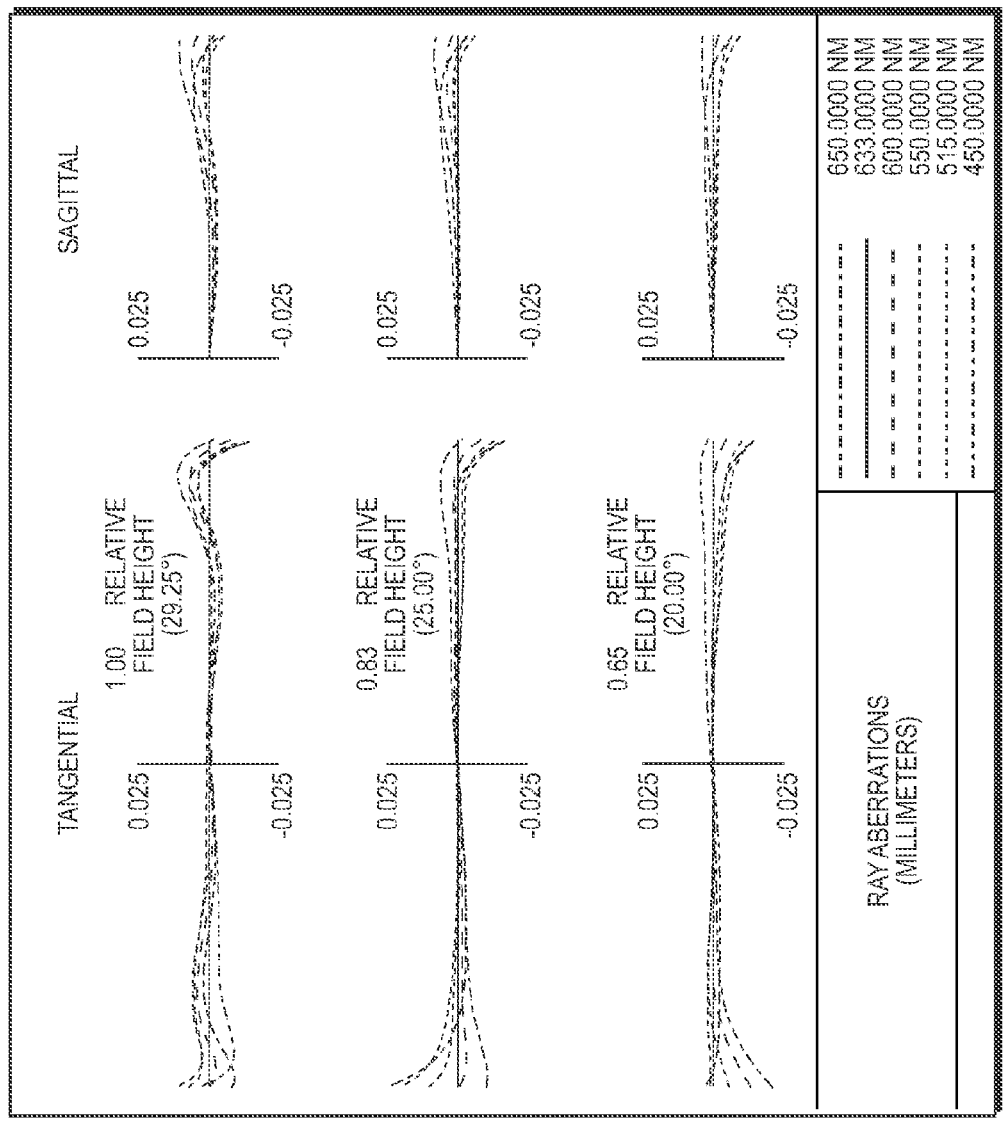
FIG. 18B includes a plurality of graphs presenting additional RIM RAY curves for the embodiment of FIG. 15.
Figure 19A:
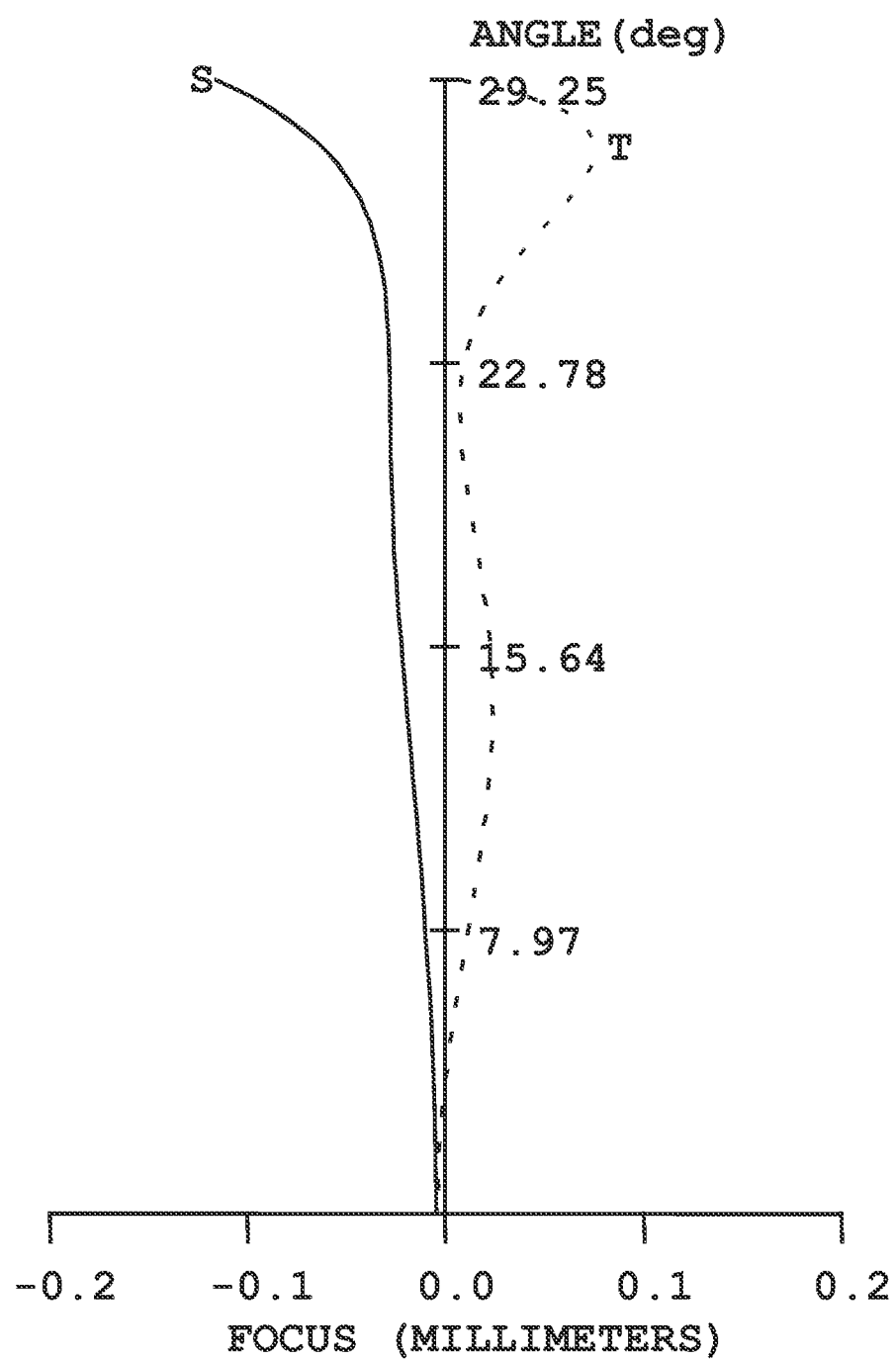
FIG. 19A presents a graph of field aberration data for the embodiment of FIG. 15.
Figure 19B:
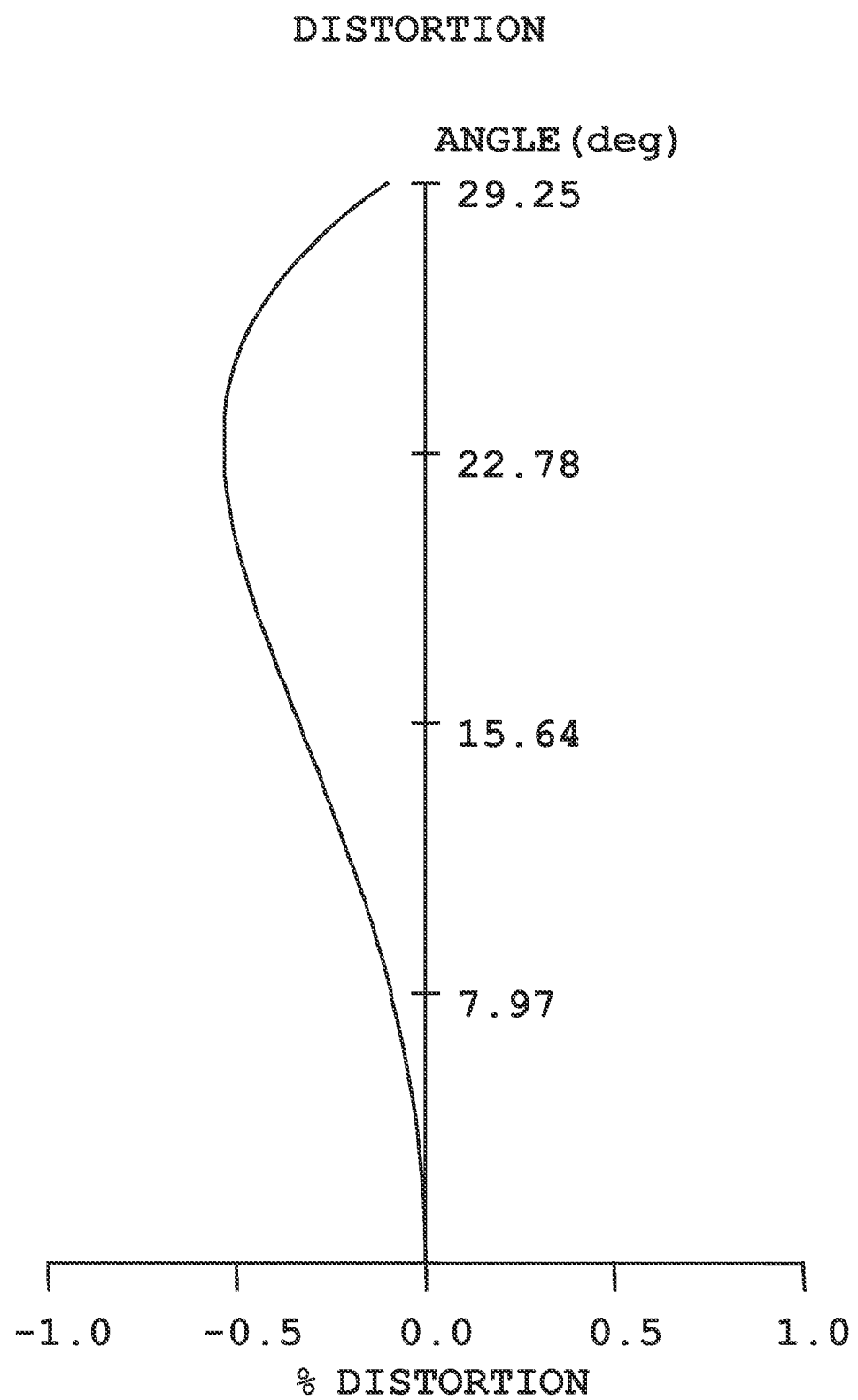
FIG. 19B presents a graph of distortion data for the embodiment of FIG. 15.
Figure 20:
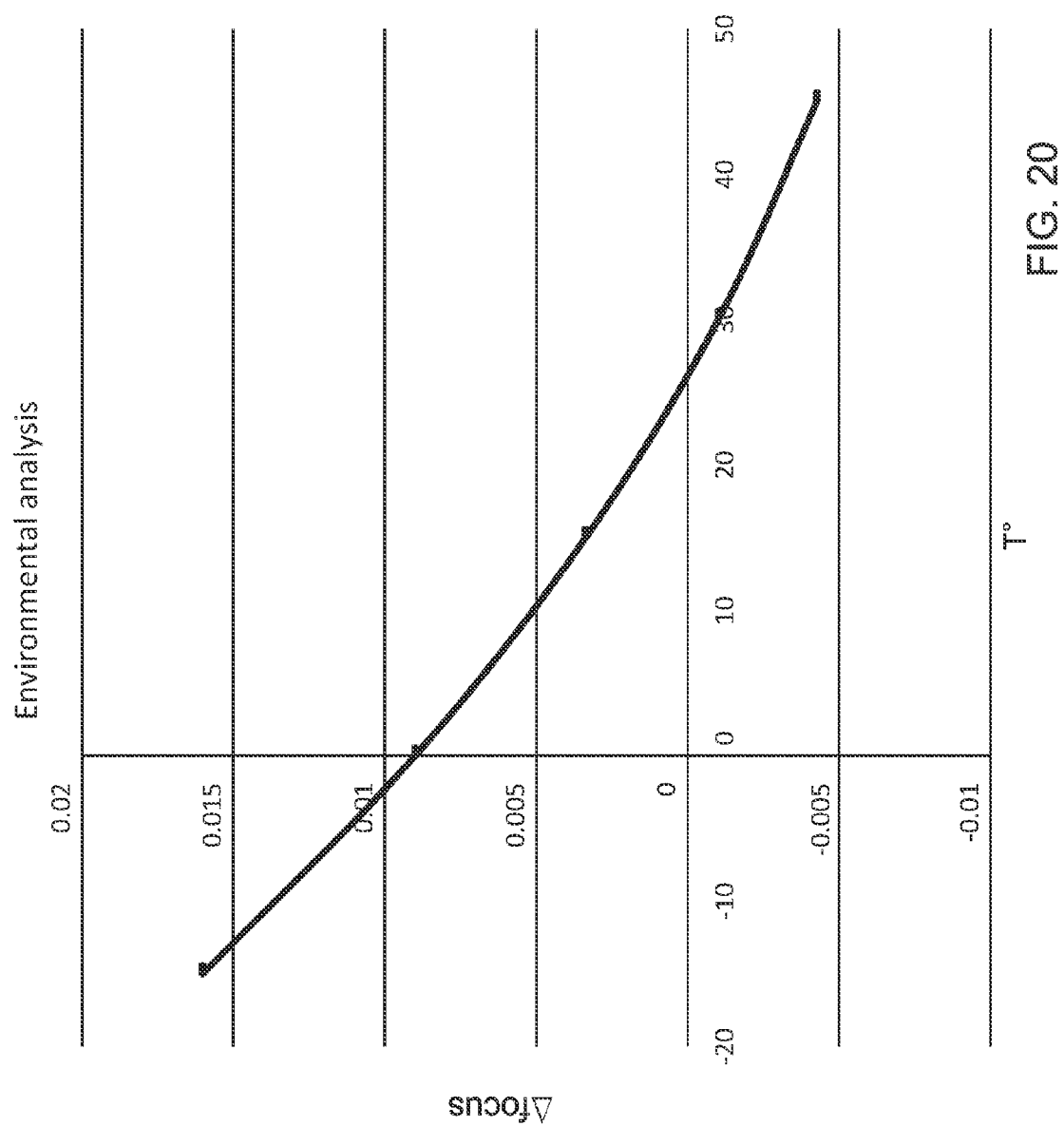
FIG. 20 is a graph presenting environmental analysis for the embodiment of FIG. 15.

Wave front and MTF data for the embodiment of FIG. 15 are presented in FIG. 16 and FIG. 17 respectively. The wave front is well corrected over the whole spectrum and is polychromatic. The MTF shows good resolution and contract over the entire field of view. The RIM RAY curves presented in FIG. 18A and FIG. 18B show the spherical aberration, coma, and chromatic corrections over the wavelength range of 450 nm-650 nm. Astigmatism graphs are presented in FIG. 19A, and distortion graphs are presented in FIG. 19B. The field is flat and the distortion is corrected to less than 0.55% over the entire field of view. Data regarding the change of the focus with temperature is presented in FIG. 20. The amount of defocus over the temperature range of –15° to 45° is 0.02 mm, which is 2.25 times less than depth of focus of 0.045 mm. The lack of telecentricity is less than 8.5° across the field of view. A prescription of the lens is presented in FIG. 21. The optical materials used in the embodiment of FIG. 15 include optical glasses that are common and widely available commercially.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A low distortion lens suitable for airborne photography, comprising:

a first optical group including a plurality of optical elements;

a second optical group, including a plurality of optical elements;

an aperture located within the second optical group; and a third optical group, including a plurality of optical elements, the distortion of the lens being not more than 0.6%, the low distortion lens having a full field of view of at least 60°, with a quality performance field of 53°, the low distortion lens being telecentric to less than 11°, the low distortion lens being apochromatic over a range of at least 450 nm to 650 nm, the low distortion lens being athermal over a temperature range of at least –15° C. to +40° C., and the low distortion lens having a length that does not exceed 180 mm, an optical window not being included in the length.

2. The low distortion lens of claim 1, wherein the first optical group includes exactly two optical elements, and the third optical group includes exactly three optical elements.

3. The low distortion lens of claim 2, wherein the second optical group includes exactly six optical elements.

4. The low distortion lens of claim 2, wherein the second optical group includes exactly seven optical elements.

5. The low distortion lens of claim 1, wherein the lens has a focal plane of at least 104 mm.

6. The low distortion lens of claim 1, wherein the lens is compatible for use with a CMOS 1.8 gigapixel multiple FPA (focal plane array) having a 2×2 Bayer filter geometry and a pixel size of 2.2 μm×2.2 μm, wherein each CMOS image sensor pixel includes a series of dielectric layers above the photo detector, with a micro lens on top of each pixel to focus light onto the active area of the pixel floor, thereby minimizing both the amount of light lost and the amount of light incident on adjacent photodiodes.

7. The low distortion lens of claim 1, wherein at least one surface of one of the optical elements in each of at least two of the optical groups is aspherical.

8. The low distortion lens of claim 1, wherein the first optical group corrects the lens for pupil spherical aberration, coma, and astigmatism, the second optical group corrects the lens for first order chromatic aberrations, spherical abberations, coma, and astigmatism, while also athermalizing the lens, and the third optical group corrects the lens for field curvature and astigmatism.

9. The low distortion lens of claim 1, wherein:
the first optical group has a positive optical power;
the second optical group has a positive optical power;
the third optical group has a positive optical power;
the first optical group includes two optical elements having, in order, a negative optical power and a positive optical power respectively, the first optical group being arranged to converge light received from an object and to direct the converged light onto the second optical group;
the second optical group includes seven optical elements having, in order, a positive optical power, a negative optical power, a positive optical power, a negative optical power, a positive optical power, a positive optical power, and a negative optical power, the second optical group being arranged to converge light received from the first optical group and to direct the converged light onto the third optical group;
the third optical group includes three optical elements having, in order, a negative optical power, a positive optical power, and a positive optical power, the third optical group being arranged to focus the light from the second optical group onto an imaging surface;
the focal lengths of the lens and of the optical groups satisfy the relationships $0.09 < F'_{10}/F'_{20} < 0.14,$ $0.8 < F'_{10}/F'_{30} < 1.2,$ and $0.1 < F'_{10}/F'_{40} < 0.15,$ where
$F'_{10}$ is the focal length of the lens, and
$F'_{20}, F'_{30}$ and $F'_{40}$ are focal lengths of the first, the second and the third optical groups respectively;
the indexes of refraction of the optical elements satisfy the relationships $0.65 < n_{21}/n_{22} < 0.95,$ $0.75 < n_{21}/n_{31} = n_{21}/n_{35} < 0.95,$ $1.05 < n_{31}/n_{33} < 1.3,$ $0.95 < n_{31}/n_{36} < 1.35,$ $0.75 < n_{36}/n_{37} < 1.1,$ $0.85 < n_{21}/n_{41} < 1.15,$ $0.65 < n_{41}/n_{42} < 0.9,$ and $0.7 < n_{41}/n_{43} < 0.95,$ where
$n_{21}$, and $n_{22}$ are the refractive indices of the first and second optical elements of the first optical group, respectively,
$n_{31}, n_{33}, n_{35}, n_{36},$ and $n_{37}$ are the refractive indices of the first, third, fifth, sixth, and seventh optical elements of the second optical group, respectively, and
$n_{41}, n_{42}$ and $n_{43}$ are the refractive indices of the first, second, and third optical elements of the third optical group, respectively;
the Abbe numbers for the optical elements satisfy the relationships $1.35 < V_{21}/V_{22} < 1.65,$ $1.45 < V_{21}/V_{31} = V_{21}/V_{35} < 1.7,$ $0.95 < V_{31}/V_{32} = V_{35}/V_{34} < 1.1,$ $0.9 < V_{21}/V_{33} < 1.1,$ $0.9 < V_{21}/V_{36} < 1.1,$ $1.55 < V_{21}/V_{37} < 1.75,$ $0.55 < V_{21}/V_{41} < 0.75,$ $2.4 < V_{21}/V_{42} < 2.8,$ and $1.5 < V_{21}/V_{43} < 1.9,$ where
$V_{21}$, and $V_{22}$ are the Abbe numbers for the first, and second optical elements of the first optical group, respectively,
$V_{31}, V_{32}, V_{33}, V_{34}, V_{35}, V_{36},$ and $V_{37}$ are the Abbe numbers for the first, second, third, fourth, fifth, sixth, and seventh optical elements of the second optical group, respectively, and
$V_{41}, V_{42},$ and $V_{43}$ are the Abbe numbers for the first, second, and third optical elements of the third optical group, respectively;
the partial dispersions of the optical elements satisfy the relationships $0.0025 < P_{41}/V_{41} < 0.0035,$ and $0.095 < P_{42}/V_{42} < 0.0135,$ where
$P_{41}$ is the partial dispersion for the first optical element of the third optical group, and
$P_{42}$ is the partial dispersion for the second optical element of the third optical group; and
the changes of refractive index with temperature satisfy the relationships $0.2 < dn/dT_{21}/dn/dT_{22} < 0.35,$ $0.35 < dn/dT_{21}/dn/dT_{31} = dn/dT_{21}/dn/dT_{35} < 0.55,$ $0.9 < dn/dT_{21}/dn/dT_{33} < 1.1,$ $0.9 < dn/dT_{21}/dn/dT_{36} < 1.1,$ $0.3 < dn/dT_{21}/dn/dT_{37} < 0.4,$ $-0.15 < dn/dT_{21}/dn/dT_{41} < -0.09,$ $0.9 < dn/dT_{21}/dn/dT_{42} < 1.25,$ and $0.18 < dn/dT_{21}/dn/dT_{43} < 0.25,$ where $dn/dT_{21}$ is the refractive index change with temperature for the first optical element of the first optical group, $dn/dT_{22}$ is the refractive index change with temperature for the second optical element of the first optical group, $dn/dT_{31}$ is the refractive index change with temperature for the first optical element of the second optical group, $dn/dT_{33}$ is the refractive index change with temperature for the third optical element of the second optical group, $dn/dT_{34}$ is the refractive index change with temperature for the fourth optical element of the second optical group, $dn/dT_{35}$ is the refractive index change with temperature for the fifth optical element of the second optical group, $dn/dT_{36}$ is the refractive index change with temperature for the sixth optical element of the second optical group, $dn/dT_{37}$ is the refractive index change with temperature for the seventh optical element of the second optical group, $dn/dT_{41}$ is the refractive index change with temperature for the first optical element of the third optical group, $dn/dT_{42}$ is the refractive index change with temperature for the second optical element of the third optical group, and $dn/dT_{43}$ is the refractive index change with temperature for the third optical element of the third optical group.

10. The low distortion lens of claim 1, wherein the first optical element of the first optical group is a double concave lenses, and the second optical element of the first optical group is a double convex lens.

11. The low distortion lens of claim 10, wherein the second surface of the second optical element of the first optical group is aspherical.

12. The low distortion lens of claim 9, wherein:
the first optical element of the second optical group is a double convex lens;
the second optical element of the second optical group is a double concave lens;
the third optical element of the second optical group is a double convex lens;
the fourth optical element of the second optical group is a double concave lens;
the fifth optical element of the second optical group is a double convex lens;
the sixth optical element of the second optical group is a double convex lens; and
the seventh optical element of the second optical group is a double concave lens.

13. The low distortion lens of claim 11, wherein the first surface of the seventh optical element of the second optical group is aspherical.

14. The low distortion lens of claim 12, wherein the first and second optical elements of the second optical group are cemented to one another.

15. The low distortion lens of claim 12, wherein the fourth and fifth optical elements of the second optical group are cemented to one another.

16. The low distortion lens of claim 9, wherein the aperture stop is located between the third and fourth optical elements of the second optical group.

17. The low distortion lens of claim 9, wherein:
the first optical element of the third optical group is shaped as a negative meniscus lens whose concave surface faces toward the object;
the second optical element of the third optical group is a positive meniscus lens whose concave surface faces toward the object; and
the third optical element of the third optical group is a double convex lens.

18. The low distortion lens of claim 17, wherein the first optical element of the third optical group is made from CaF2.

19. The low distortion lens of claim 17, wherein the first surface of the second optical element of the third optical group is aspherical.

20. The low distortion lens of claim 1, wherein:
the first optical group has a negative optical power;
the second optical group has a positive optical power;
the third optical group has a positive optical power;
the first optical group includes two optical elements having, in order, a negative optical power and a positive optical power respectively, the first optical group being arranged to converge light received from an object and to direct the converged light onto the second optical group;
the second optical group includes seven optical elements having, in order, a positive optical power, a negative optical power, a positive optical power, a negative optical power, a positive optical power, a positive optical power, and a negative optical power, the second optical group being arranged to converge light received from the first optical group and to direct the converged light onto the third optical group;
the third optical group includes three optical elements having, in order, a negative optical power, a positive optical power, and a positive optical power, the third optical group being arranged to focus the light from the second optical group onto an imaging surface;
the focal lengths of the lens and of the optical groups satisfy the relationships $-0.1 < F'_{100}/F'_{200} < -0.07,$ $1.35 < F'_{100}/F'_{300} < 1.55,$ and $0.17 < F'_{100}/F'_{400} < 0.19,$ where $F'_{100}$ is the focal length of the lens, and $F'_{200}$, $F'_{300}$ and $F'_{400}$ are focal lengths of the first, the second and the third optical groups respectively;

the indexes of refraction of the optical elements satisfy the relationships $0.70 < n_{210}/n_{220} < 0.90,$ $0.80 < n_{210}/n_{310} = n_{210}/n_{350} < 1,$ $1 < n_{310}/n_{330} < 1.25,$ $0.9 < n_{310}/n_{360} < 1.3,$ $0.65 < n_{360}/n_{370} < 1.05,$ $0.80 < n_{210}/n_{410} < 1.1,$ $0.7 < n_{410}/n_{420} < 0.85,$ and $0.8 < n_{410}/n_{430} < 0.95,$ where
 $n_{210}$, and $n_{220}$ are the refractive indices of the first and second optical elements of the first optical group, respectively,
 $n_{310}$, $n_{330}$, $n_{350}$, $n_{360}$, and $n_{370}$ are the refractive indices of the first, third, fifth, sixth, and seventh optical elements of the second optical group, respectively, and
 $n_{410}$, $n_{420}$, and $n_{430}$ are the refractive indices of the first, second, and third optical elements of the third optical group, respectively;

the Abbe numbers for the optical elements satisfy the relationships $1.55 < V_{210}/V_{220} < 1.85$, $1.4 < V_{210}/V_{310} = V_{210}/V_{350} < 1.65$, $0.85 < V_{310}/V_{320} = V_{350}/V_{340} < 1.15$, $0.85 < V_{210}/V_{330} < 1$, $0.95 < V_{210}/V_{360} < 1.1$, $1.6 < V_{210}/V_{370} < 1.8$, $0.85 < V_{210}/V_{410} < 1.2$, $2.2 < V_{210}/V_{420} < 2.6$, and $1.45 < V_{210}/V_{430} < 1.75$, where
 $V_{210}$, and $V_{220}$ are the Abbe numbers for the first, and second optical elements of the first optical group, respectively,
 $V_{310}$, $V_{320}$, $V_{330}$, $V_{340}$, $V_{350}$, $V_{360}$, and $V_{370}$ are the Abbe numbers for the first, second, third, fourth, fifth, sixth, and seventh optical elements of the second optical group, respectively, and
 $V_{410}$, $V_{420}$, and $V_{430}$ are the Abbe numbers for the first, second, and third optical elements of the third optical group, respectively;

the partial dispersions of the optical elements satisfy the relationships $0.0035 < P_{410}/V_{410} < 0.0055$, and $0.1 < P_{420}/V_{420} < 0.015$, where
 $P_{410}$ is the partial dispersion for the first optical element of the third optical group, and
 $P_{420}$ is the partial dispersion for the second optical element of the third optical group; and the changes of refractive index with temperature satisfy the relationships $0.15 < dn/dT_{210}/dn/dT_{220} < 0.3$, $0.4 < dn/dT_{210}/dn/dT_{310} = dn/dT_{210}/dn/dT_{305} < 0.6$, $0.85 < dn/dT_{210}/dn/dT_{330} < 1.05$, $0.8 < dn/dT_{210}/dn/dT_{360} < 1.1$, $0.35 < dn/dT_{210}/dn/dT_{370} < 0.5$, $0.9 < dn/dT_{210}/dn/dT_{410} < 1.2$, $0.85 < dn/dT_{210}/dn/dT_{420} < 1.3$, and $0.15 < dn/dT_{210}/dn/dT_{430} < 0.3$, where
 $dn/dT_{210}$ is the refractive index change with temperature for the first optical element of the first optical group,
 $dn/dT_{220}$ is the refractive index change with temperature for the second optical element of the first optical group,
 $dn/dT_{310}$ is the refractive index change with temperature for the first optical element of the second optical group,
 $dn/dT_{330}$ is the refractive index change with temperature for the third optical element of the second optical group,
 $dn/dT_{340}$ is the refractive index change with temperature for the fourth optical element of the second optical group,
 $dn/dT_{350}$ is the refractive index change with temperature for the fifth optical element of the second optical group,
 $dn/dT_{360}$ is the refractive index change with temperature for the sixth optical element of the second optical group,
 $dn/dT_{370}$ is the refractive index change with temperature for the seventh optical element of the second optical group,
 $dn/dT_{410}$ is the refractive index change with temperature for the first optical element of the third optical group,
 $dn/dT_{420}$ is the refractive index change with temperature for the second optical element of the third optical group, and
 $dn/dT_{430}$ is the refractive index change with temperature for the third optical element of the third optical group.

21. The low distortion lens of claim 20, wherein the first optical element of the first optical group is a double concave lenses, and the second optical element of the first optical group is a double convex lens.

22. The low distortion lens of claim 21, wherein the second surface of the second optical element of the first optical group is aspherical.

23. The low distortion lens of claim 20, wherein:
the first optical element of the second optical group is a double convex lens;
the second optical element of the second optical group is a double concave lens;
the third optical element of the second optical group is a double convex lens;
the fourth optical element of the second optical group is a double concave lens;
the fifth optical element of the second optical group is a double convex lens;
the sixth optical element of the second optical group is a double convex lens; and
the seventh optical element of the second optical group is a double concave lens.

24. The low distortion lens of claim 23, wherein the first surface of the seventh optical element of the second optical group is aspherical.

25. The low distortion lens of claim 23, wherein the first and second optical elements of the second optical group are cemented to one another.

26. The low distortion lens of claim 23, wherein the fourth and fifth optical elements of the second optical group are cemented to one another.

27. The low distortion lens of claim 20, wherein the aperture stop is located between the third and fourth optical elements of the second optical group.

28. The low distortion lens of claim 20, wherein:
the first optical element of the third optical group is shaped as a negative meniscus lens whose concave surface faces toward the object;
the second optical element of the third optical group is a positive meniscus lens whose concave surface faces toward the object; and
the third optical element of the third optical group is a double convex lens.

29. The low distortion lens of claim 28, wherein the first optical element of the third optical group is made from CaF2.

30. The low distortion lens of claim 28, wherein the first surface of the second optical element of the third optical group is aspherical.

31. The low distortion lens of claim 1, wherein:
all three optical groups have positive optical powers;
the first optical group includes two optical elements having, in order, a negative optical power and a positive optical power respectively, the first optical group being arranged to converge light received from an object and to direct the converged light onto the second optical group;
the second optical group includes six optical elements having, in order, a negative optical power, a positive optical power, a negative optical power, a positive optical power, a positive optical power, and a negative optical power, the second optical group being arranged to converge light received from the first optical group and to direct the converged light onto the third optical group;
the third optical group includes three optical elements having, in order, a negative optical power, a positive optical power, and a positive optical power, the third optical group being arranged to focus the light from the second optical group onto an imaging surface;
the focal lengths of the lens and of the optical groups satisfy the relationships $2.6 < F'_{1000}/F'_{700} < 3.4$ $2 < F'_{1000}/F'_{800} < 2.6$ $2.2 < F'_{1000}/F'_{900} < 2.7$ where
$F'_{1000}$ is the focal length of the lens, and
$F'_{700}$, $F'_{800}$ and $F'_{900}$ are focal lengths of the first, the second and the third optical groups respectively;
the indexes of refraction of the optical elements satisfy the relationships $0.65 < n_{701}/n_{702} < 0.95$ $0.75 < n_{701}/n_{801} = n_{701}/n_{803} = n_{701}/n_{804} = n_{701}/n_{806} < 1$ $0.95 < n_{801}/n_{802} = n_{801}/n_{805} < 1.25$ $0.90 < n_{701}/n_{901} < 1.15$ $0.7 < n_{901}/n_{902} < 0.9$ $0.75 < n_{801}/n_{903} < 0.95$ where
$n_{701}$, and $n_{702}$ are the refractive indices of the first and second optical elements of the first optical group, respectively,
$n_{801}$, $n_{802}$, $n_{803}$, $n_{804}$, $n_{805}$, and $n_{806}$ are the refractive indices of the first, second, third, fourth, fifth, and sixth optical elements of the second optical group, respectively, and
$n_{901}$, $n_{902}$, and $n_{903}$ are the refractive indices of the first, second, and third optical elements of the third optical group, respectively;
the Abbe numbers for the optical elements satisfy the relationships $1.35 < V_{701}/V_{702} < 1.7$ $1.4 < V_{701}/V_{801} = V_{701}/V_{803} = V_{701}/V_{806} < 1.8$ $0.45 < V_{801}/V_{802} = V_{801}/V_{805} = < 0.75$ $0.85 < V_{803}/V_{804} < 1.15$ $0.85 < V_{701}/V_{901} < 1.15$ $2.4 < V_{701}/V_{902} < 2.8$ $1.55 < V_{701}/V_{903} < 1.85$ where
$V_{701}$, and $V_{702}$ are the Abbe numbers for the first, and second optical elements of the first optical group, respectively,
$V_{801}$, $V_{802}$, $V_{803}$, $V_{804}$, $V_{805}$, and $V_{806}$ are the Abbe numbers for the first, second, third, fourth, fifth, and sixth optical elements of the second optical group, respectively, and
$V_{901}$, $V_{902}$, and $V_{903}$ are the Abbe numbers for the first, second, and third optical elements of the third optical group, respectively;
the partial dispersions of the optical elements satisfy the relationships $0.004 < P_{901}/V_{901} < 0.006$ $0.95 < P_{902}/V_{902} < 0.015$ where
$P_{901}$ is the partial dispersion for the first optical element of the third optical group, and
$P_{902}$ is the partial dispersion for the second optical element of the third optical group; and
the changes of refractive index with temperature satisfy the relationships $0.2 < dn/dT_{701}/dn/dT_{702} < 0.35$ $0.25 < dn/dT_{701}/dn/dT_{801} = dn/dT_{701}/dn/dT_{803} = dn/dT_{701}/dn/dT_{806} < 0.45$ $0.85 < dn/dT_{701}/dn/dT_{802} = dn/dT_{701}/dn/dT_{805} << 1.15$ $0.4 < dn/dT_{701}/dn/dT_{804} < 0.6$ $0.8 < dn/dT_{701}/dn/dT_{901} < 1.2$ $1 < dn/dT_{701}/dn/dT_{902} < 1.25$ $0.1 < dn/dT_{701}/dn/dT_{903} < 0.35$ where
$dn/dT_{701}$ is the refractive index change with temperature for the first optical element of the first optical group,
$dn/dT_{702}$ is the refractive index change with temperature for the second optical element of the first optical group,
$dn/dT_{801}$ is the refractive index change with temperature for the first optical element of the second optical group,
$dn/dT_{802}$ is the refractive index change with temperature for the third optical element of the second optical group, $dn/dT_{803}$ is the refractive index change with temperature for the fourth optical element of the second optical group, $dn/dT_{804}$ is the refractive index change with temperature for the fifth optical element of the second optical group, $dn/dT_{805}$ is the refractive index change with temperature for the sixth optical element of the second optical group, $dn/dT_{806}$ is the refractive index change with temperature for the seventh optical element of the second optical group, $dn/dT_{901}$ is the refractive index change with temperature for the first optical element of the third optical group, $dn/dT_{902}$ is the refractive index change with temperature for the second optical element of the third optical group, and $dn/dT_{903}$ is the refractive index change with temperature for the third optical element of the third optical group.

32. The low distortion lens of claim 31, wherein the first optical element of the first optical group is a double concave lens, and the second optical element of the first optical group is a double convex lens.

33. The low distortion lens of claim 32, wherein the second surface of the second optical element of the first optical group is aspherical.

34. The low distortion lens of claim 31, wherein:
the first optical element of the second optical group is a double concave lens;
the second optical element of the second optical group is a double convex lens;
the third optical element of the second optical group is a double concave lens;
the fourth optical element of the second optical group is a double convex lens;
the fifth optical element of the second optical group is a double convex lens; and
the sixth optical element of the second optical group is a double concave lens.

35. The low distortion lens of claim 34, wherein the first surface of the sixth optical element of the second optical group is aspherical.

36. The low distortion lens of claim 34, wherein the third and fourth optical elements of the second optical group are cemented to one another.

37. The low distortion lens of claim 31, wherein the aperture stop is located between the second and third optical elements of the second optical group.

38. The low distortion lens of claim 31, wherein:
the first optical element of the third optical group is shaped as a negative meniscus lens whose concave surface faces toward the object;
the second optical element of the third optical group is a positive meniscus lens whose concave surface faces toward the object; and
the third optical element of the third optical group is a double convex lens.

39. The low distortion lens of claim 38, wherein the first surface of the second optical element of the third optical group is aspherical.

* * * * *